United States Patent
Oshimi

(10) Patent No.: US 7,540,898 B2
(45) Date of Patent: Jun. 2, 2009

(54) HONEYCOMB STRUCTURED BODY

(75) Inventor: Yukio Oshimi, Gifu (JP)

(73) Assignee: Ibiden Co., Ltd., Gifu (JP)

( * ) Notice: Subject to any disclaimer, the term of this patent is extended or adjusted under 35 U.S.C. 154(b) by 0 days.

(21) Appl. No.: 11/513,149

(22) Filed: Aug. 31, 2006

(65) Prior Publication Data

US 2007/0044444 A1    Mar. 1, 2007

Related U.S. Application Data

(63) Continuation of application No. PCT/JP2005/021697, filed on Nov. 25, 2005.

(30) Foreign Application Priority Data

Nov. 26, 2004    (JP) .............................. 2004-343042

(51) Int. Cl.
*B01D 39/20* (2006.01)
*B01D 46/00* (2006.01)
*F01N 3/022* (2006.01)

(52) U.S. Cl. ...................... 55/523; 55/282.3; 55/385.3; 55/482; 55/484; 55/524; 55/DIG. 5; 55/DIG. 10; 55/DIG. 30; 60/299; 60/311; 502/439

(58) Field of Classification Search ................ 55/282.2, 55/282.3, 385.3, 482, 484, 523, 524, DIG. 5, 55/DIG. 10, DIG. 30; 60/295, 297, 299, 60/300, 303, 311; 502/439; 264/630, 44

See application file for complete search history.

(56) References Cited

U.S. PATENT DOCUMENTS

| | | | |
|---|---|---|---|
| 4,529,718 A | * | 7/1985 | Dupin ....................... 502/439 |
| 4,632,683 A | | 12/1986 | Fukutani et al. |
| 5,914,187 A | | 6/1999 | Naruse et al. |
| 5,958,829 A | * | 9/1999 | Domesle et al. ............. 502/439 |
| 6,426,316 B2 | * | 7/2002 | Tanaka et al. ............... 502/340 |

(Continued)

FOREIGN PATENT DOCUMENTS

EP    0 766 993 A2    4/1997

(Continued)

OTHER PUBLICATIONS

Related case list.

(Continued)

*Primary Examiner*—Jason M Greene
(74) *Attorney, Agent, or Firm*—Finnegan, Henderson, Farabow, Garrett & Dunner LLP

(57) ABSTRACT

A honeycomb structured body of the present invention is a honeycomb structured body in which a plurality of porous ceramic members are combined with one another through an adhesive layer, each of the porous ceramic members having a plurality of cells which are allowed to penetrate in a longitudinal direction with a wall portion therebetween and either one end of which is sealed, with a catalyst supporting layer being adhered to said wall portion, wherein pores formed in said porous ceramic member are constituted by large pores having a relatively large pore diameter and small pores having a relatively small pore diameter, and supposing that: the thickness of the catalyst supporting layer is $X_1$ (μm), and the value, obtained by multiplying the porosity (%) of said porous ceramic member by the ratio (the average pore diameter of said large pores/the average pore diameter of said small pores) of the average pore diameter of said large pores to the average pore diameter of said small pores, is $Y_1$, these $X_1$ and $Y_1$ are allowed to satisfy the following inequalities (1) and (2):

$$6X_1 + 80.5 \leq Y_1 \leq 6X_1 + 230.5 \qquad (1)$$

$$-6X_1 + 330 \leq Y_1 \leq -6X_1 + 474 \qquad (2).$$

12 Claims, 6 Drawing Sheets

U.S. PATENT DOCUMENTS

| | | |
|---|---|---|
| 6,669,751 B1 | 12/2003 | Ohno et al. |
| 6,939,825 B1 | 9/2005 | Ohno et al. |
| 7,119,046 B2 | 10/2006 | Ohno et al. |
| 2003/0024220 A1 | 2/2003 | Ishihara et al. |
| 2004/0033175 A1 | 2/2004 | Ohno et al. |
| 2004/0055265 A1 | 3/2004 | Ohno et al. |
| 2004/0161596 A1 | 8/2004 | Taoka et al. |
| 2005/0076626 A1 | 4/2005 | Kudo et al. |
| 2005/0102987 A1 | 5/2005 | Kudo |
| 2005/0109023 A1 | 5/2005 | Kudo et al. |
| 2005/0153099 A1 | 7/2005 | Yamada |
| 2005/0154021 A1 | 7/2005 | Dutta |
| 2005/0160710 A1 | 7/2005 | Taoka et al. |
| 2005/0161849 A1 | 7/2005 | Ohno et al. |
| 2005/0169818 A1 | 8/2005 | Ohno et al. |
| 2005/0169819 A1 | 8/2005 | Shibata |
| 2005/0175514 A1 | 8/2005 | Ohno |
| 2005/0176581 A1 | 8/2005 | Ohno et al. |
| 2005/0178098 A1 | 8/2005 | Ono et al. |
| 2005/0180898 A1 | 8/2005 | Yamada |
| 2005/0229565 A1 | 10/2005 | Yoshida |
| 2005/0247038 A1 | 11/2005 | Takahashi |
| 2005/0272602 A1 | 12/2005 | Ninomiya |
| 2006/0051556 A1 | 3/2006 | Ohno et al. |
| 2006/0073970 A1 | 4/2006 | Yamada |
| 2006/0135343 A1 | 6/2006 | Ohno et al. |
| 2006/0154021 A1 | 7/2006 | Ohno et al. |
| 2006/0166820 A1 | 7/2006 | Ogyu et al. |
| 2006/0172113 A1 | 8/2006 | Kunieda |
| 2006/0179803 A1 | 8/2006 | Ohno et al. |
| 2006/0188415 A1 | 8/2006 | Ohno et al. |
| 2006/0194018 A1 | 8/2006 | Ohno et al. |
| 2006/0210765 A1 | 9/2006 | Ohno et al. |
| 2006/0213163 A1 | 9/2006 | Taoka et al. |
| 2006/0216466 A1 | 9/2006 | Yoshida |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0228521 A1 | 10/2006 | Ohno et al. |
| 2006/0230732 A1 | 10/2006 | Kunieda |
| 2006/0254231 A1 | 11/2006 | Hayashi et al. |
| 2007/0028575 A1 | 2/2007 | Ohno et al. |
| 2007/0065348 A1 | 3/2007 | Ohno et al. |
| 2007/0068128 A1 | 3/2007 | Oshimi et al. |
| 2007/0116908 A1 | 5/2007 | Ohno et al. |
| 2007/0128405 A1 | 6/2007 | Sakaguchi et al. |
| 2007/0130897 A1 | 6/2007 | Sakaguchi et al. |
| 2007/0169453 A1 | 7/2007 | Hayakawa |
| 2007/0190289 A1 | 8/2007 | Fujita |
| 2007/0190350 A1 | 8/2007 | Ohno et al. |

FOREIGN PATENT DOCUMENTS

| | | | |
|---|---|---|---|
| EP | 1 403 231 A1 | * | 3/2004 |
| EP | 1 790 407 A1 | | 9/2005 |
| EP | 1 588 995 A1 | | 10/2005 |
| EP | 1 723 998 A1 | | 11/2006 |
| EP | 1 795 262 A1 | | 6/2007 |
| JP | 09-220423 | | 8/1997 |
| JP | 9-220423 | | 8/1997 |
| JP | 2002 349234 | | 12/2002 |
| JP | 2002-349234 | * | 12/2002 |
| JP | 2003-210922 | | 7/2003 |
| WO | WO 02/096827 | | 12/2002 |

OTHER PUBLICATIONS

U.S. Appl. No. 10/129,126.
U.S. Appl. No. 10/518,548.
U.S. Appl. No. 11/225,197.
U.S. Appl. No. 11/476,929.
U.S. Appl. No. 11/513,149.
U.S. Appl. No. 11/600,775, Sakaguchi.
U.S. Appl. No. 11/600,784, Sakaguchi.
U.S. Appl. No. 11/712,372, Ohno et al.
PCT International Preliminary Report on Patentability, International Application No. PCT/JP2005/021697, date of issuance of report May 30, 2007 (5 pgs.).
U.S. Appl. No. 11/760,037.
U.S. Appl. No. 11/683,698.
European Search Report dated Jan. 8, 2008 on Application No./ Patent No. 05809600.9-2104 PCT/JP2005021697 (14 pgs.).

* cited by examiner

A-A line cross-section view

B-B line cross-section view

HONEYCOMB STRUCTURED BODY

CROSS-REFERENCE TO RELATED APPLICATIONS

This application is a continuation application of PCT/JP2005/021697 filed on Nov. 25, 2005, which claims priority of Japanese Patent Application No. 2004-343042 filed on Nov. 26, 2004. The contents of these applications are incorporated herein by reference in their entirety.

BACKGROUND OF THE INVENTION

1. Field of the Invention

The present invention relates to a honeycomb structured body used as a filter for removing particulates and the like contained in exhaust gases discharged from an internal combustion engine such as a diesel engine, a catalyst supporting carrier, and the like.

2. Discussion of the Background

Recently, particulates such as soot and the like contained in exhaust gases discharged from internal combustion engines of vehicles, such as buses and trucks, and construction machines, have raised serious problems as those particulates are harmful to the environment and the human body.

There have been proposed various honeycomb structured bodies made from porous ceramics, which serve as filters capable of capturing particulates in exhaust gases to purify the exhaust gases.

There have been proposed honeycomb structured bodies of a type in which a catalyst is supported thereon so that active energy of burning particulates is reduced so as to easily burn particulates and a type in which a function of converting toxic gas components such as CO, HC, NOx and the like in exhaust gases is exerted.

Nowadays, an attempt has been made to manufacture a honeycomb structured body having a high porosity in order to increase the amount of the supported catalyst.

In order to manufacture such a honeycomb structured body with a high porosity, it is necessary to form large pores, and with respect to the method for forming large pores, a method using a pore-forming agent has been proposed (see WO 02/96827 A1).

With respect to the pore-forming agent of this type, particles made from an organic matter such as resin and particles, referred to as balloons, made of an organic matter or an inorganic matter with cavities formed therein, have been used. When the pore-forming agent of this type is mixed with material ceramic powder and the like, and then molded and fired, the particles and balloons made from organic matters are burned to disappear and the inorganic balloons are maintained as they are, that is, with cavities formed inside; thus, it is possible to obtain a honeycomb structured body having large pores therein.

Moreover, in the case where material ceramic powder having a particle diameter greater than a normal size is used, it is possible to obtain a honeycomb structured body having large pores. In this case, while large particles are combined with one another during a firing process, the gaps between filled particles increase in proportion to the particle diameter so that a honeycomb structured body having large pores can be obtained.

The contents of WO 02/96827 A1 are incorporated herein by reference in their entirety.

SUMMARY OF THE INVENTION

A honeycomb structured body according to a first aspect of the present invention is a honeycomb structured body in which a plurality of porous ceramic members are combined with one another through an adhesive layer, each of the porous ceramic members having a plurality of cells which are allowed to penetrate in a longitudinal direction with a wall portion therebetween and either one end of which is sealed, with a catalyst supporting layer being adhered to the wall portion, wherein pores formed in the porous ceramic member are constituted by large pores having a relatively large pore diameter and small pores having a relatively small pore diameter, and supposing that:

the thickness of the catalyst supporting layer is $X_1$ (µm), and the value, obtained by multiplying the porosity (%) of the porous ceramic member by the ratio (the average pore diameter of the large pores/the average pore diameter of the small pores) of the average pore diameter of the large pores to the average pore diameter of the small pores, is $Y_1$, these $X_1$ and $Y_1$ are allowed to satisfy the following inequalities (1) and (2):

$$6X_1+80.5 \leq Y_1 \leq 6X_1+230.5 \tag{1}$$

$$-6X_1+330 \leq Y_1 \leq -6X_1+474 \tag{2}$$

A honeycomb structured body according to the second aspect of the present invention is a honeycomb structured body comprising a porous ceramic in which a plurality of cells which are allowed to penetrate in a longitudinal direction with a wall portion therebetween and either one end of which is sealed, and a catalyst supporting layer adhered to the wall portion, wherein pores formed in the porous ceramic are constituted by large pores having a relatively large pore diameter and small pores having a relatively small pore diameter, and supposing that:

the thickness of the catalyst supporting layer is $X_2$ (µm), and the value, obtained by multiplying the porosity (%) of the porous ceramic by the ratio (the average pore diameter of the large pores/the average pore diameter of the small pores) of the average pore diameter of the large pores to the average pore diameter of the small pores, is $Y_2$, these $X_2$ and $Y_2$ are allowed to satisfy the following inequalities (3) and (4):

$$6X_2+80.5 \leq Y_2 \leq 6X_2+230.5 \tag{3}$$

$$-6X_2+330 \leq Y_2 \leq -6X_2+474 \tag{4}$$

The honeycomb structured body in accordance with the first aspect of the present invention desirably comprises silicon carbide-based ceramics or a composite body between silicon and silicon carbide, and the honeycomb structured body in accordance with the second aspect of the present invention desirably comprises of cordierite or aluminum titanate.

In the following description, a honeycomb structured body having a structure in which a plurality of porous ceramic members are combined with one another through an adhesive layer, such as the honeycomb structured body in accordance with the first aspect of the present invention, is referred to as an aggregated honeycomb structured body. In contrast, a honeycomb structured body having an integral form as a whole, such as the honeycomb structured body in accordance with the second aspect of the present invention, is referred to as an integral honeycomb structured body. Moreover, in the case where it is not necessary to specifically distinguish the integral honeycomb structured body and the aggregated honeycomb structured body, this is simply referred to as "honeycomb structured body".

In the present specification, the small pores are defined as those pores that have a pore diameter of less than 30 μm, when observed by a scanning electron microscope (hereinafter, referred to as SEM); the large pores are defined as those pores that have a pore diameter in a range of 30 μm to 100 μm, when observed by an SEM; and the ultra-large pores are defined as those pores that have a pore diameter exceeding 100 μm, when observed by an SEM. Moreover, the average pore diameter of large pores is defined as the average value of pore diameters of the large pores, while the average pore diameter of small pores is defined as the average value of pore diameters of the small pores.

Here, in the case where powder obtained by combining coarse powder with fine powder is used as the material ceramic powder to form a ceramic molded body so that the above-mentioned porous ceramic member or porous ceramic is formed through a firing process, the ceramic particles composing the porous ceramic member or the porous ceramic have almost the same particle diameter as the particle diameter of the coarse powder.

The large pores formed in the honeycomb structured body in accordance with the present invention desirably include an ultra-large pore having a pore diameter exceeding 100 μm. Moreover, the ultra-large pore is formed due to a plurality of pore-forming agents in a ceramic molded body used for firing being located close to each other, and the aspect ratio of the ultra-large pore is desirably about 2 or more.

In the honeycomb structured body in accordance with the present invention, the thickness of the catalyst supporting layer is desirably at least about 8.3 μm and at most about 33 μm.

In the honeycomb structured body in accordance with the first aspect of the present invention, desirably, the porosity of the porous ceramic member is at least about 40% and at most about 75%. In the honeycomb structured body in accordance with the second aspect of the present invention, desirably, the porosity of the porous ceramic is at least about 40% and at most about 75%.

Furthermore, the honeycomb structured body desirably contains ultra-large pores, each having a diameter of at least about 40% and at most about 90% of the thickness of each of the wall portion.

DESCRIPTION OF THE EMBODIMENTS

A honeycomb structured body according to the embodiments of a first aspect of the present invention is a honeycomb structured body in which a plurality of porous ceramic members are combined with one another through an adhesive layer, each of the porous ceramic members having a plurality of cells which are allowed to penetrate in a longitudinal direction with a wall portion therebetween and either one end of which is sealed, with a catalyst supporting layer being adhered to the wall portion, wherein pores formed in the porous ceramic member are constituted by large pores having a relatively large pore diameter and small pores having a relatively small pore diameter, and supposing that:

the thickness of the catalyst supporting layer is $X_1$ (μm), and the value, obtained by multiplying the porosity (%) of the porous ceramic member by the ratio (the average pore diameter of the large pores/the average pore diameter of the small pores) of the average pore diameter of the large pores to the average pore diameter of the small pores, is $Y_1$, these $X_1$ and $Y_1$ are allowed to satisfy the following inequalities (1) and (2):

$$6X_1+80.5 \leq Y_1 \leq 6X_1+230.5 \quad (1)$$

$$-6X_1+330 \leq Y_1 \leq -6X_1+474 \quad (2).$$

Figure 1:
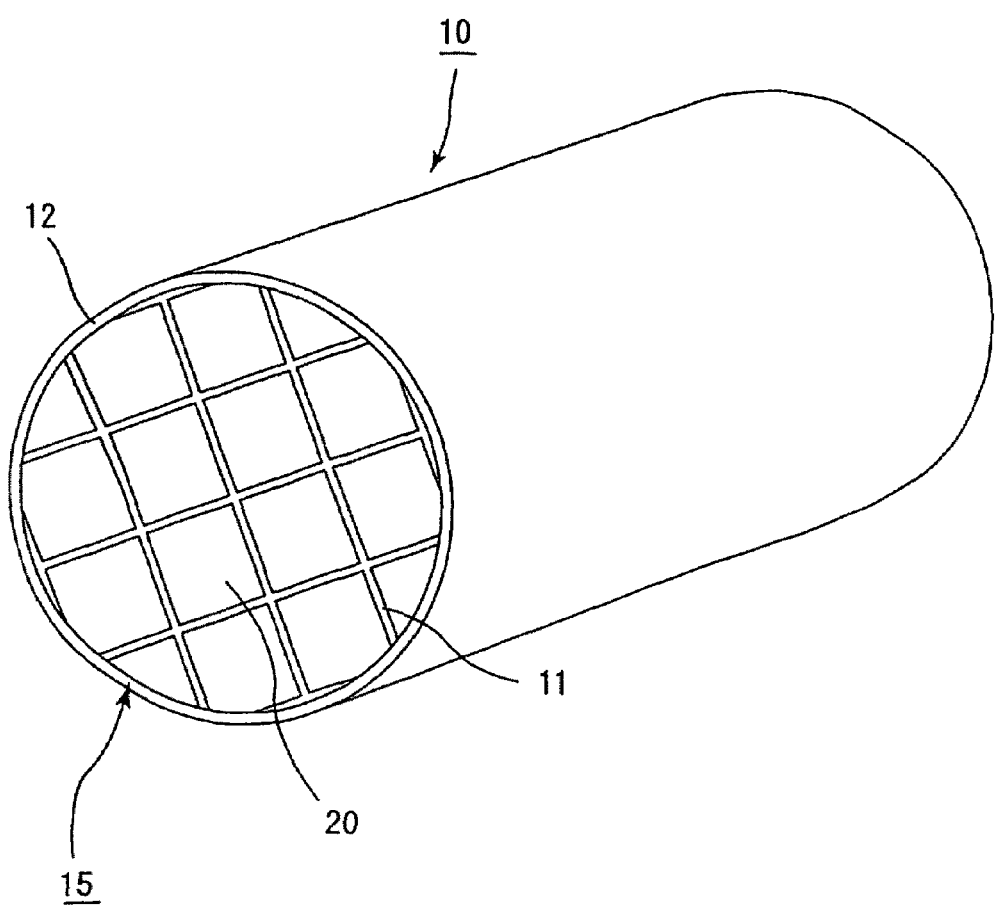
FIG. 1 is a perspective view that schematically shows one example of the honeycomb structured body in accordance with one embodiment of the first aspect of the present invention.
Figure 2A:
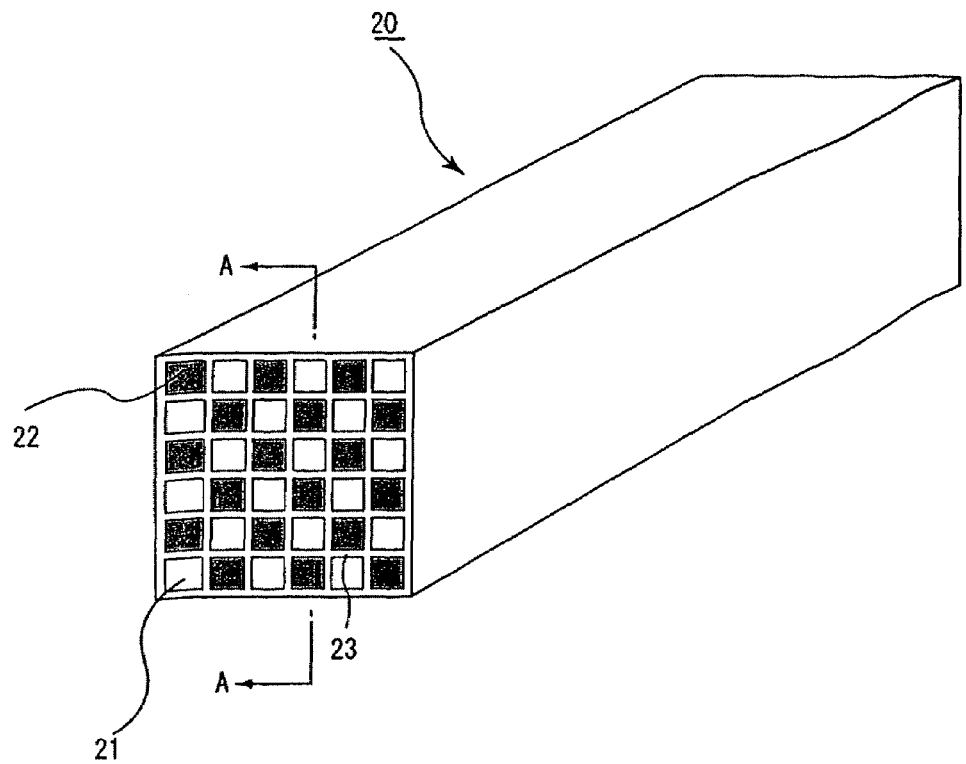
FIG. 2A is a perspective view showing porous ceramic members that comprise the honeycomb structured body in accordance with one embodiment of the first aspect of the present invention.
Figure 2B:
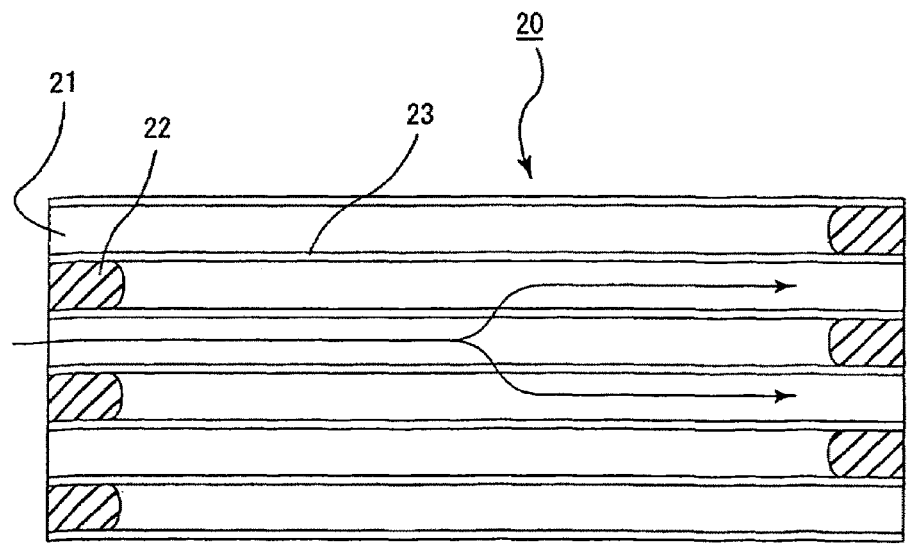
FIG. 2B shows its cross-sectional view taken along line A-A.

FIG. 1 is a perspective view that schematically shows the aggregated honeycomb structured body according to the first aspect of the present invention, FIG. 2A is a perspective view showing porous ceramic members that comprise the honeycomb structured body shown in FIG. 1, and FIG. 2B is a cross-sectional view taken along line A-A of the porous ceramic member shown in FIG. 2A.

As shown in FIG. 1, the honeycomb structured body in accordance with one embodiment of the first aspect of the present invention is an aggregated-type honeycomb structured body 10 in which a plurality of porous ceramic members 20 made from silicon carbide or the like are combined with each other through adhesive layers 11 to form a cylindrical ceramic block 15, and a sealing material layer (coat layer) 12 is formed on the periphery of this ceramic block 15.

In the honeycomb structured body 10 in accordance with one embodiment of the first aspect of the present invention shown in FIG. 1, the shape of the ceramic block is a cylindrical shape; however, in the present invention, the ceramic block is not limited to the cylindrical shape as long as it has a pillar shape, and any desired shape, such as a cylindroid shape and a rectangular pillar shape, may be applied.

As shown in FIGS. 2A and 2B, the porous ceramic member 20 has a number of cells 21 placed in parallel with one another in the longitudinal direction so that wall portions (cell walls) 23 that separate the cells 21 are allowed to function as filters. In other words, each of the cells 21 formed in the porous ceramic member 20 has either one of the ends on the inlet side or the outlet side of exhaust gases sealed with a plug 22 as shown in FIG. 2B so that exhaust gases that have flowed into one of the cells 21 are allowed to flow out of another cell 21 after surely having passed through a wall portion (cell wall) 23 that separates the cells 21.

The honeycomb structured body in accordance with the embodiments of the first aspect of the present invention is mainly made of porous ceramic materials, and with respect to the material, examples thereof include: nitride ceramics such as aluminum nitride, silicon nitride, boron nitride and titanium nitride; carbide ceramics such as silicon carbide, zirconium carbide, titanium carbide, tantalum carbide, and tungsten carbide; and oxide ceramics such as alumina, zirconia, cordierite, mullite, and silica. Here, the honeycomb structured body 10 may be formed by using materials of two or more kinds, such as a composite body between silicon and silicon carbide, or aluminum titanate. In the case where the composite body between silicon and silicon carbide is used, silicon is desirably added thereto so as to be set to at least about 0% and at most about 45% by weight in the entire body.

With respect to the material of the porous ceramic member, silicon carbide based ceramics which have a high heat resistance or a composite body between silicon and silicon carbide, is superior in mechanical characteristics and has a high thermal conductivity is desirably used. Here, the silicon carbide based ceramics refers to a material having a silicon carbide content of about 60% by weight or more.

The honeycomb structured body 10 in accordance with one embodiment of the first aspect of the present invention is a honeycomb structured body with a catalyst supporting layer adhered thereto, and a catalyst is supported on the catalyst supporting layer.

With respect to the catalyst, although not particularly limited, those which can reduce activating energy of burning particulates so that the particulates are readily burned, or those which can convert toxic gas components in exhaust gases such as CO, HC and NOx are desirably used, and examples thereof may include noble metals such as platinum, palladium and rhodium, and the like. Among these, a so-called three-way catalyst, made from platinum, palladium and rhodium, is desirably used. Moreover, in addition to the noble metal, an alkali metal (Group 1 in Element Periodic Table), an alkali earth metal (Group 2 in Element Periodic Table), a rare-earth element (Group 3 in Element Periodic Table), a transition metal element and the like may be supported thereon.

The honeycomb structured body 10 as mentioned above can convert CO, HC, NOx and the like in exhaust gases.

By adhering the catalyst supporting layer to the honeycomb structured body 10, and supporting catalyst on the catalyst supporting layer, the honeycomb structured body 10 is allowed to function as a filter capable of capturing particulates in exhaust gases, and also to function as a catalyst converter for converting CO, HC, NOx and the like contained in exhaust gases.

Moreover, when the catalyst is adhered to the honeycomb structured body 10, it is desirable to apply the catalyst after the surface thereof is coated with a catalyst supporting carrier such as alumina. With this arrangement, the specific surface area may readily be made greater so that the degree of dispersion of the catalyst may be improved and the reaction sites of the catalyst may readily be increased. Since it may become possible to readily prevent sintering of the catalyst metal by the catalyst supporting carrier, the heat resistance of the catalyst may also be improved.

With respect to the catalyst supporting layer, oxide ceramics such as alumina, titania, zirconia, silica and ceria can be used.

Moreover, by supporting the above-mentioned catalyst, oxidation reaction and the like progress on the catalyst, and heat of reaction is generated, thereby it may become easier to raise the temperature of the honeycomb structured body 10.

According to the honeycomb structured body in accordance with the embodiments of the first aspect of the present invention, pores formed in the porous ceramic member are constituted by large pores having a relatively large pore diameter and small pores having a relatively small pore diameter, and supposing that: the thickness of the catalyst supporting layer is $X_1$ (μm), and the value, obtained by multiplying the porosity (%) of the porous ceramic member by the ratio (the average pore diameter of the large pores/the average pore diameter of the small pores) of the average pore diameter of the large pores to the average pore diameter of the small pores, is $Y_1$, these $X_1$, and $Y_1$ are allowed to satisfy the following inequalities (1) and (2):

$$6X_1+80.5 \leq Y_1 \leq 6X_1+230.5 \quad (1)$$

$$-6X_1+330 \leq Y_1 \leq -6X_1+474 \quad (2).$$

Figure 5:
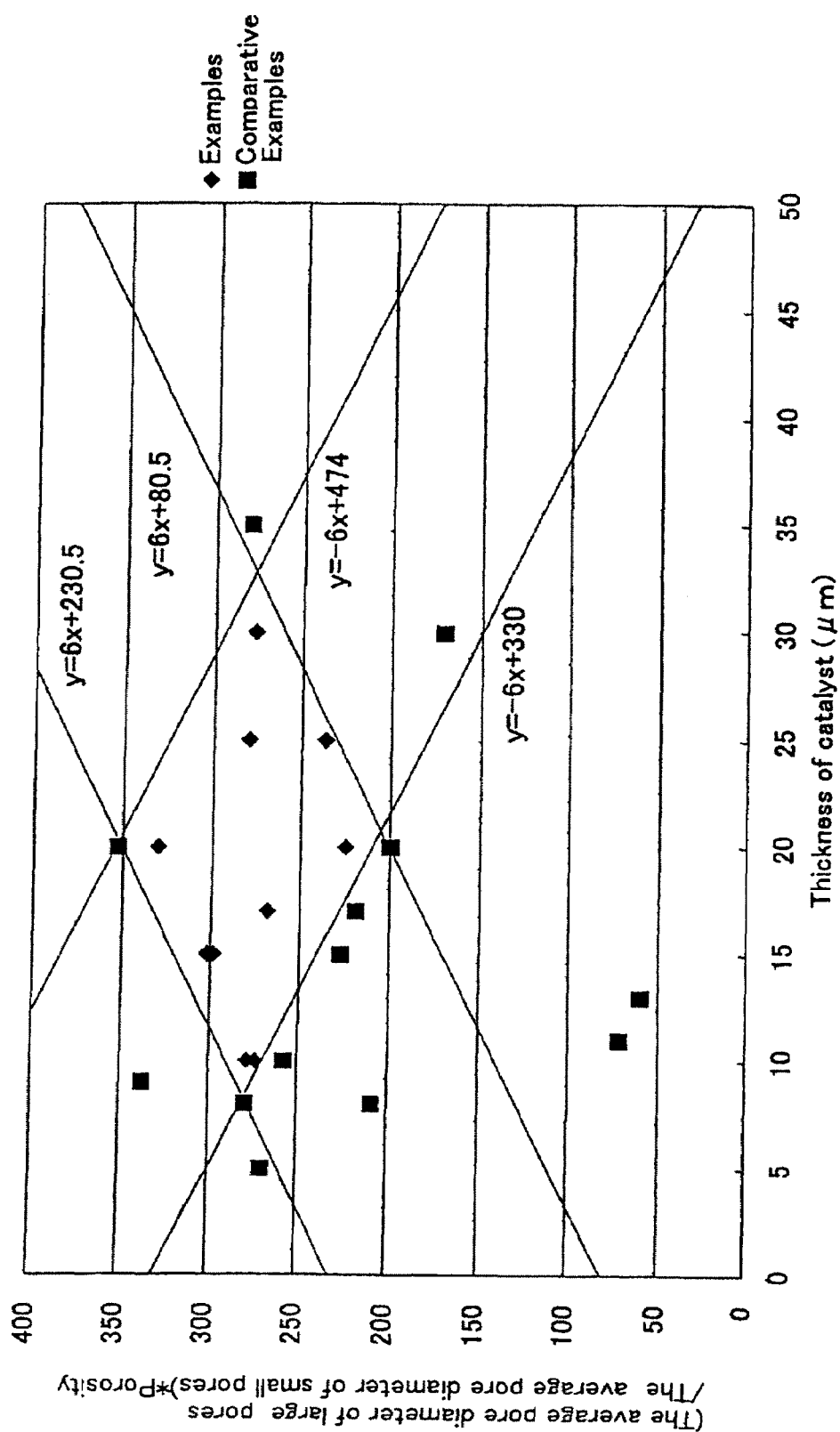
FIG. 5 is a graph that shows a relationship between the thickness of a catalyst supporting layer and the value obtained by multiplying the porosity by the ratio of (the average pore diameter of large pores/the average pore diameter of small pores).

FIG. 5 is a graph that shows a relationship between the thickness of a catalyst supporting layer and the value of (the average pore diameter of large pores/the average pore diameter of small pores)×the porosity of the porous ceramic member, and as shown in FIG. 5, when the thickness of the catalyst supporting layer is plotted on the X-axis, with the value of (the ratio of large pore diameter/small pore diameter)×the porosity being plotted on the Y-axis, an area inside a parallelogram enclosed by four lines, $Y_1=6X_1+80.5$, $Y_1=6X_1+230.5$, $Y_1=-6X_1+330$ and $Y_1=-6X_1+474$, is given as a range of the present invention.

In the honeycomb structured body according to the embodiments of the first aspect of the present invention, when the relationship between the value of (the average pore diameter of large pores/the average pore diameter of small pores)× the porosity of the porous ceramic member and the thickness of the catalyst supporting layer or the like formed in the honeycomb structured body is included in the area of the parallelogram shown in FIG. 5 (that is, is allowed to satisfy the above-mentioned inequalities (1) and (2)), it may become easier to provide a honeycomb structured body which exerts sufficient catalyst functions, and can reduce the initial pressure loss when used as a filter or the like, makes the pressure loss hardly increase upon capturing of particulates, and also has a sufficient mechanical strength.

In the case where $Y_1$ does not satisfy any of $Y_1 \leq 6X_1+230.5$ and $Y_1 \leq -6X_1+474$, that is, when $Y_1 > 6X_1+230.5$ or $Y_1 > -6X_1+474$ is satisfied (see FIG. 5), the following problems arise.

When $Y_1$ is indicated by $Y_1 > 6X_1+230.5$, the diameter of large pores becomes too large to cause a reduction in the strength of the base member, which tends to easily cause insufficient durability in the filter. In contrast, when $Y_1$ is indicated by $Y_1 > -6X_1+474$, the small pores are clogged by the catalyst, making it difficult for a catalyst reaction to take place.

In the case where $Y_1$ does not satisfy any of $6X_1+80.5 \leq Y_1$ and $-6X_1+330 \leq Y_1$, that is, when $Y_1 < 6X_1+80.5$ or $Y_1 < -6X_1+330$ is satisfied (see FIG. 5), the following problems arise.

In these cases, the possible problems are that the small pores become too large and that the large pores become too small.

In the case where the small pores become too large, upon capturing particulates, the particulates tend to be easily made to be deep-layer-filtered inside the small pore and may tend to cause a thick deposition layer of particulates, which may result to easily increase the pressure loss.

In contrast, in the case where the large pores become too small, the gas permeability tends to readily become poor, resulting in an increase in the transient pressure loss. Additionally, in the case where the large pores become too small, since ultra-large pores, which are formed by two or three large pores located close to one another, are hardly generated, the gas permeability tends to deteriorate in comparison with the structure in which ultra-large pores are present.

The thickness of a catalyst supporting layer that satisfies the inequalities of (1) and (2) is set to at least about 8.3 μm and at most about 33 μm as shown in FIG. 5.

In the case where the thickness of the catalyst supporting layer is about 8.3 μm or more, since the amount of the catalyst supporting carrier or the like may be prevented from becoming too small, degradation in the dispersing property of a noble metal catalyst hardly occurs, and it may become easier in providing a honeycomb structured body having sufficient durability in the catalyst; in contrast, in the case where the thickness of the catalyst supporting layer is about 33 μm or less, the thickness of the catalyst supporting layer tends to hardly become too thick. Thus, even when the diameter of the small pores is made larger, the small pores tend to be hardly clogged, and gases may be allowed to easily pass through the surface of each small pore, making it easier to exert a catalyst reaction.

The porosity of the porous ceramic member 20 is not particularly limited, and the lower limit value is desirably set to about 40%, while the upper limit value is desirably set to about 75%. When the porosity is about 40% or more, it tends to become easier to increase the rate of large pores; therefore, it may become easier to obtain the effects of forming the large pores. In contrast, when the porosity is about 75% or less, it becomes easier to maintain sufficient mechanical strength in the honeycomb structured body.

The upper limit of the porosity of the porous ceramic member 20 is more desirably set to about 65%.

The above-mentioned porosity can be measured through known methods such as a mercury injection method, Archimedes method and a measuring method using a scanning electron microscope (SEM).

As described above, the pore diameter of the large pores forming the honeycomb structured body 10 is set in a range of 30 to 100 μm when observed by an SEM, and the lower limit of the pore diameter of the large pores is desirably set to 40 μm. In the case where the average pore diameter of the large pores is less than 30 μm, since the pore diameter is too small to serve as the large pores, the pores tend to be clogged with a slight increase in the thickness of the catalyst supporting layer which may easily cause an increase in the pressure loss. In contrast, when the average pore diameter of the large pores exceeds 100 μm, the pore diameter tends to easily become large, which may make it difficult to sufficiently increase the mechanical strength.

In addition to the large pores, the honeycomb structured body 10 desirably contains ultra-large pores that have a pore diameter exceeding 100 μm when observed by an SEM. Thus, the effect for reducing the pressure loss tends to easily become greater.

Figure 6:
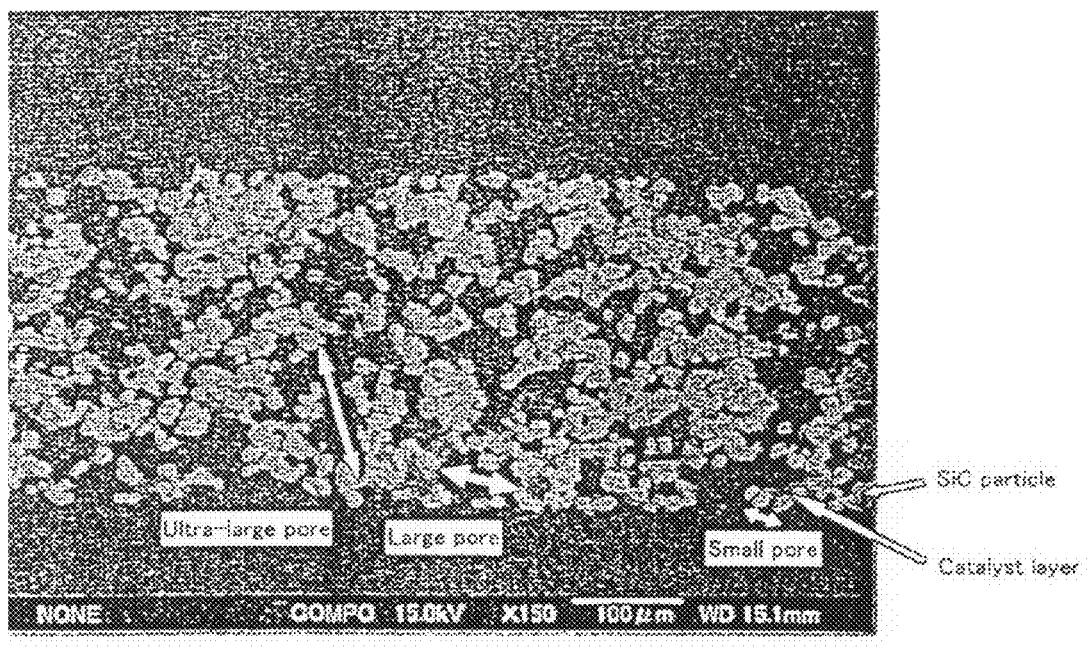
FIG. 6 is an SEM photograph that shows the results of observation processes in which cell walls were cut and pores formed on each cell wall were observed through an SEM.

FIG. 6 is an SEM photograph that shows the results of observation processes in which cell walls were cut and pores formed on each cell wall were observed through the SEM, and as shown in this figure, a catalyst layer is formed in a manner so as to cover each SiC particle, and small pores of a pore diameter of less than 30 μm are formed, with large pores of a pore diameter of 30 to 100 μm, considered to have been mainly formed by the pore-forming agent, being also observed.

Moreover, as shown in FIG. 6, in addition to the small pores and large pores, there are extremely large pores each of which forms a large space to be regarded as a pore, with the diameter (length in the longitudinal direction) of the space exceeding 100 μm, and this pore is referred to as "ultra-large pore".

Moreover, the honeycomb structured body 10 desirably contains the ultra-large pores, each having a diameter of at least about 40% and at most about 90% of the thickness of each wall portion (cell wall) that separates cells of the honeycomb structured body 10. When the diameter is about 40% or more, it may become easier to obtain the effect for suppressing an increase in the pressure loss; in contrast, when the diameter is about 90% or less, it may become easier to maintain sufficient mechanical strength in the honeycomb structured body 10.

In the case where the ultra-large pores are contained in the honeycomb structured body, since portions that allow gases to escape easily are generated in the honeycomb structured body, the gas permeability of the honeycomb structured body is improved so that the pressure loss hardly increases even upon capturing of particulates.

As will be described later, since the thickness of each cell wall is desirably set to about 0.6 mm or less, the diameter of the ultra-large pore is desirably set to about 540 μm or less. Furthermore, the large pores to be formed in the honeycomb structured body 10 desirably include ultra-large pores, each having a diameter in the range of about 65% to about 80% of the thickness of each wall portion (cell wall) that separates cells of the honeycomb structured body 10.

The rate of the ultra-large pores among the pores that are 30 μm or more is desirably set to at least about 30 vol % and at most about 80 vol %.

The ultra-large pore is formed due to a plurality of pore-forming agents in a ceramic molded body used for firing being located close to each other, and the aspect ratio of the ultra-large pore is desirably about 2 or more.

Thus, since the ultra-large pore is allowed to have a long and narrow shape, gases can readily pass through the ultra-large pore.

As will be described later in detail, the pore-forming agent is a material that is mainly used for forming large pores in the porous ceramic (porous ceramic member), and contained in the ceramic molded body to be fired.

The pore diameter of each of the small pores formed in the honeycomb structured body 10 is less than 30 μm, when observed by the SEM; however, the pore diameter is more desirably set to about 5 μm or more. In the case where the average pore diameter of the small pores is less than 30 μm, since the small pores may be prevented from becoming too large, particulates may hardly be made to be deep-layer-filtered to prevent the deposition layer of the particulates from becoming large, and also preventing the pressure loss from becoming high. In contrast, when the average pore diameter of the small pores is about 5 μm or more, the pore diameter is prevented from becoming too small. Therefore, even when the thickness of the catalyst supporting layer is made thinner, the pressure loss tends to be prevented from increasing.

With respect to the above-mentioned pore-forming agent, examples thereof include balloons that are fine hollow spheres composed of oxide-based ceramics; organic particles comprising an organic matter (e.g. resin and the like) such as spherical acrylic particles; and inorganic particles such as graphite and the like.

With respect to the above-mentioned balloons, although not particularly limited, examples thereof include alumina balloons, glass micro-balloons, shirasu balloons, fly ash balloons (FA balloons), mullite balloons and the like. Among these, alumina balloons are more desirably used.

With respect to the particle diameter of the ceramic used upon manufacturing the honeycomb structured body 10, although not particularly limited, those which are less susceptible to shrinkage in the succeeding firing process are desirably used, and for example, those particles, prepared by combining 100 parts by weight of particles having an average particle diameter of at least about 0.3 μm and at most about 50 μm with at least about 5 parts by weight and at most about 65 parts by weight of particles having an average particle diameter of at least about 0.1 μm and at most about 1.0 μm, are desirably used.

By mixing ceramic powders having the above-mentioned particle diameter with the above-mentioned combination, a honeycomb structured body comprising porous ceramic members can be manufactured. Also, by selecting the average particle diameter of each powder, the porosity and pore diameter of a fine pore having a pore diameter of about 10 μm or less can be adjusted to a certain degree.

The plug 22 and the wall portion 23 that configure the porous ceramic member 20 are desirably made from the same porous ceramic material. With this arrangement, the contact strength between the two members is increased, and by adjusting the porosity of the plug 22 in the same manner as the wall portions 23, the coefficient of thermal expansion of the wall portions 23 and the coefficient of thermal expansion of the plug 22 are properly adjusted so that it becomes possible to prevent a gap from being generated between the plug 22 and the wall portions 23 due to a thermal stress upon production and in use and also to prevent cracks from occurring in the plug 22 and at portions of the wall portions 23 that are made in contact with the plug 22. Here, the wall portion refers to both the cell walls separating the cells 21 and the peripheral portion thereof.

With respect to the thickness of the plug 22, although not particularly limited, in the case where the plug 22 is made from porous silicon carbide, it is desirably set to at least about 1 mm and at most about 20 mm, more desirably in the range of about 3 mm to about 10 mm.

The thickness of the cell wall 23 is not particularly limited, and the lower limit value is set to about 0.1 mm, while the upper limit value is set to about 0.6 mm. With the thickness of about 0.1 mm or more, the strength of the honeycomb structured body 10 tends to easily become insufficient. The thickness of about 0.6 mm or less may prevent the pressure loss from becoming high.

In the honeycomb structured body 10 in accordance with one embodiment of the present invention, the adhesive layer 11, which is formed between the porous ceramic members 20, functions as an adhesive (or a plug) for binding a plurality of the porous ceramic members 20 to one another. In contrast, the sealing material layer 12, which is formed on the peripheral face of the ceramic block 15, is also allowed to function as a plug for preventing exhaust gases passing through the cells from leaking from the peripheral face of the ceramic block 15 when the honeycomb structured body 10 is placed in an exhaust passage of an internal combustion engine, and as an reinforcing member for adjusting the shape.

Here, in the porous ceramic member 20, the adhesive layer 11 and the sealing material layer 12 may be formed by using the same material, or may be formed by using different materials. In the case where the adhesive layer 11 and the sealing material layer 12 are made from the same material, the compounding ratio of materials thereof may be the same or different. Moreover, the material may have a dense structure or a porous structure and, when the importance is placed on the sealing property to prevent the influx of gases, a dense structure is more desirable.

With respect to the material used for forming the adhesive layer 11 and the sealing material layer 12, not particularly limited, for example, a material, made from inorganic fibers and/or inorganic particles in addition to an inorganic binder and an organic binder, may be used.

With respect to the above-mentioned inorganic binder, for example, silica sol and alumina sol may be used. Each of these materials may be used alone, or two or more kinds of these may be used in combination. Of the above-mentioned inorganic binders, silica sol is more desirably used.

With respect to the organic binder, examples thereof include: polyvinyl alcohol, methyl cellulose, ethyl cellulose, carboxymethyl cellulose and the like. Each of these may be used alone or two or more kinds of these may be used in combination. Among the organic binders, carboxymethyl cellulose is more desirably used.

With respect to the inorganic fibers, examples thereof include: ceramic fibers such as silica-alumina, mullite, alumina and silica. Each of these may be used alone, or two or more kinds of these may be used in combination. Among the inorganic fibers, silica-alumina fibers are more desirably used.

With respect to the inorganic particles, for example, carbides, nitrides and the like may be used, and more specifically, inorganic fine powder made from silicon carbide, silicon nitride, boron nitride or the like, or whisker may be used. Each of these may be used alone, or two or more kinds of these may be used in combination. Among the above-mentioned inorganic particles, silicon carbide, which is superior in thermal conductivity, is more desirably used.

Moreover, a pore-forming agent, such as balloons that are fine hollow spheres composed of oxide-based ceramics, spherical acrylic particles and graphite, may be added to the paste used for forming the sealing material layer and adhesive layer, if necessary.

With respect to the above-mentioned balloons, not particularly limited, for example, alumina balloons, glass micro-balloons, shirasu balloons, fly ash balloons (FA balloons), mullite balloons and the like may be used. Among these, alumina balloons are more desirably used.

The honeycomb structured body of the present invention on which the above-mentioned catalyst is supported is allowed to function as a gas purifying device in the same manner as conventionally known DPFs (Diesel Particulate Filters) with a catalyst. Therefore, with respect to the case where the integral honeycomb structured body of the present invention is used as a catalyst supporting carrier, detailed description of the functions thereof is omitted.

Next, the following description will discuss one example of a manufacturing method of the honeycomb structured body in accordance with the embodiments of the present invention.

First, an extrusion-molding process is carried out by using material paste mainly composed of the above-mentioned ceramic material so that a square-pillar shaped ceramic molded body is manufactured.

Although the material paste is not particularly limited, material paste which sets the porosity of the honeycomb structured body after the manufacturing to at least about 40% and at most about 75% is desirable, and, for example, a material paste prepared by adding a binder, a pore-forming agent, a dispersant and the like to powder made from the above-mentioned ceramics may be used.

With respect to the particle diameter of the ceramic powder, although not particularly limited, those which are less susceptible to shrinkage in the succeeding firing process are desirably used, and for example, those particles, prepared by combining 100 parts by weight of particles having an average particle diameter of at least about 0.3 µm and at most about 50 µm with at least about 5 parts by weight and at most about 65 parts by weight of particles having an average particle diameter of at least about 0.1 µm and at most about 1.0 µm, are preferably used.

In order to adjust the porosity and the like of the porous ceramic member, the firing temperature needs to be adjusted; however, the porosity and the pore diameter can be adjusted by adjusting the particle diameter of the ceramic powder.

With respect to the above-mentioned binder, not particularly limited, examples thereof include methylcellulose, carboxy methylcellulose, hydroxy ethylcellulose, polyethylene glycol and the like.

In general, the compounding amount of the above-mentioned binder is desirably set to at least about 1 part by weight and at most about 10 parts by weight with respect to 100 parts by weight of the ceramic powder.

With respect to the dispersant, although not particularly limited, examples thereof include an organic solvent such as benzene; alcohol such as methanol; water and the like.

An appropriate amount of the above-mentioned dispersant is mixed therein so that the viscosity of the material paste is set within a fixed range.

The ceramic powder, binder and dispersant are mixed by an attritor or the like, and sufficiently kneaded by a kneader or the like, and then extrusion-molded.

Moreover, a molding assistant may be added to the material paste, if necessary.

With respect to the molding assistant, although not particularly limited, examples thereof include ethylene glycol, dextrin, fatty acid soap, fatty acid, polyvinyl alcohol and the like.

Moreover, it is desirable that a pore-forming agent, such as balloons that are fine hollow spheres composed of oxide-based ceramics, spherical acrylic particles and graphite, is added to the above-mentioned material paste. With this pore-forming agent added, large pores can be formed in the honeycomb structured body.

With respect to the above-mentioned balloons, not particularly limited, for example, alumina balloons, glass microballoons, shirasu balloons, fly ash balloons (FA balloons), mullite balloons and the like may be used. Among these, alumina balloons are more desirably used.

Next, the above-mentioned ceramic molded body is dried by using a drier such as a microwave drier, a hot-air drier, a dielectric drier, a reduced-pressure drier, a vacuum drier and a frozen drier so that a ceramic dried body is formed. Thereafter, a predetermined amount of plug material paste, which forms plugs, is filled into the end portion on the outlet side of the inlet-side group of cells and the end portion on the inlet side of the outlet-side group of cells so that the cells are sealed.

With respect to the plug material paste, although not particularly limited, such paste as to set the porosity of a plug produced through the succeeding processes to at least about 40% and at most about 75% is desirably used, and for example, the same paste as the material paste may be used.

Next, the ceramic dried body filled with the plug material paste is subjected to degreasing (for example, at a temperature of at least about 200° C. and at most about 500° C.) and firing processes (for example, at a temperature of at least about 1400° C. and at most about 2300° C.) under predetermined conditions so that a porous ceramic member 20, made from porous ceramic materials and constituted by a single sintered body as a whole, is manufactured.

Here, with respect to the degreasing and firing conditions of the ceramic dried body, it is possible to apply conditions that have been conventionally used for manufacturing a filter made from porous ceramic members.

Next, in the honeycomb structured body of the present invention, an adhesive paste to form the adhesive layer 11 is applied to each of the side faces of the porous ceramic member 20 with an even thickness to form an adhesive paste layer, and by repeating a process for successively laminating another porous ceramic member 20 on this adhesive paste layer, a porous ceramic member aggregated body having a predetermined size is manufactured.

With respect to the material for forming the adhesive paste, since it has already been explained, explanation thereof is omitted.

Next, the porous ceramic member aggregated body is heated so that the adhesive paste layer is dried and solidified to form the adhesive layer 11.

Moreover, the porous ceramic member aggregated body in which a plurality of the porous ceramic members 20 are bonded to one another through the adhesive layers 11 is subjected to a cutting process by using a diamond cutter and the like so that a ceramic block 15 having a cylindrical shape is manufactured.

By forming a sealing material layer 12 on the outer periphery of the honeycomb block 15 by using the sealing material paste, a honeycomb structured body 10 in which the sealing material layer 12 is formed on the peripheral portion of the cylindrical ceramic block 15 having a plurality of the porous ceramic members 20 bonded to one another through the adhesive layers 11 can be manufactured.

The present invention provides a structure in which a catalyst supporting layer is formed, and desirably, a catalyst such as a noble metal or the like is added to this catalyst supporting layer.

After the formation thereof, the catalyst is supported; however, the catalyst supporting process may be conducted before manufacturing the above-mentioned aggregated body.

With respect to the method for forming the catalyst supporting layer made from alumina on the surface of the ceramic fired body, for example, a method in which the ceramic fired body is impregnated with a solution containing alumina powder and heated can be manufactured.

Thereafter, the ceramic fired body may be impregnated with a solution of a metal compound containing a rare-earth element or the like, such as $Ce(NO_3)_3$.

Here, upon preparing the alumina powder, a solution of a metal compound containing a rare-earth element or the like, such as $Ce(NO_3)_3$ and a solution of a metal compound containing aluminum such as $Al(NO_3)_3$ are mixed so that these elements are preliminarily allowed to stay in a mixed state, and the result may be further pulverized to be supported.

With respect to the method for applying the catalyst to the alumina film, for example, a method in which a ceramic fired body is impregnated with, for example, a solution of diammine dinitro platinum nitric acid ([Pt(NH$_3$)$_2$(NO$_2$)$_2$]HNO$_3$) and then heated is proposed.

The use of the honeycomb structured body in accordance with the embodiments of the first aspect of the present invention is not particularly limited, and it is desirably used as an exhaust gas purifying device for vehicles. The same can be said for the honeycomb structured body in accordance with the embodiments of the second aspect of the present invention mentioned below.

Figure 3:
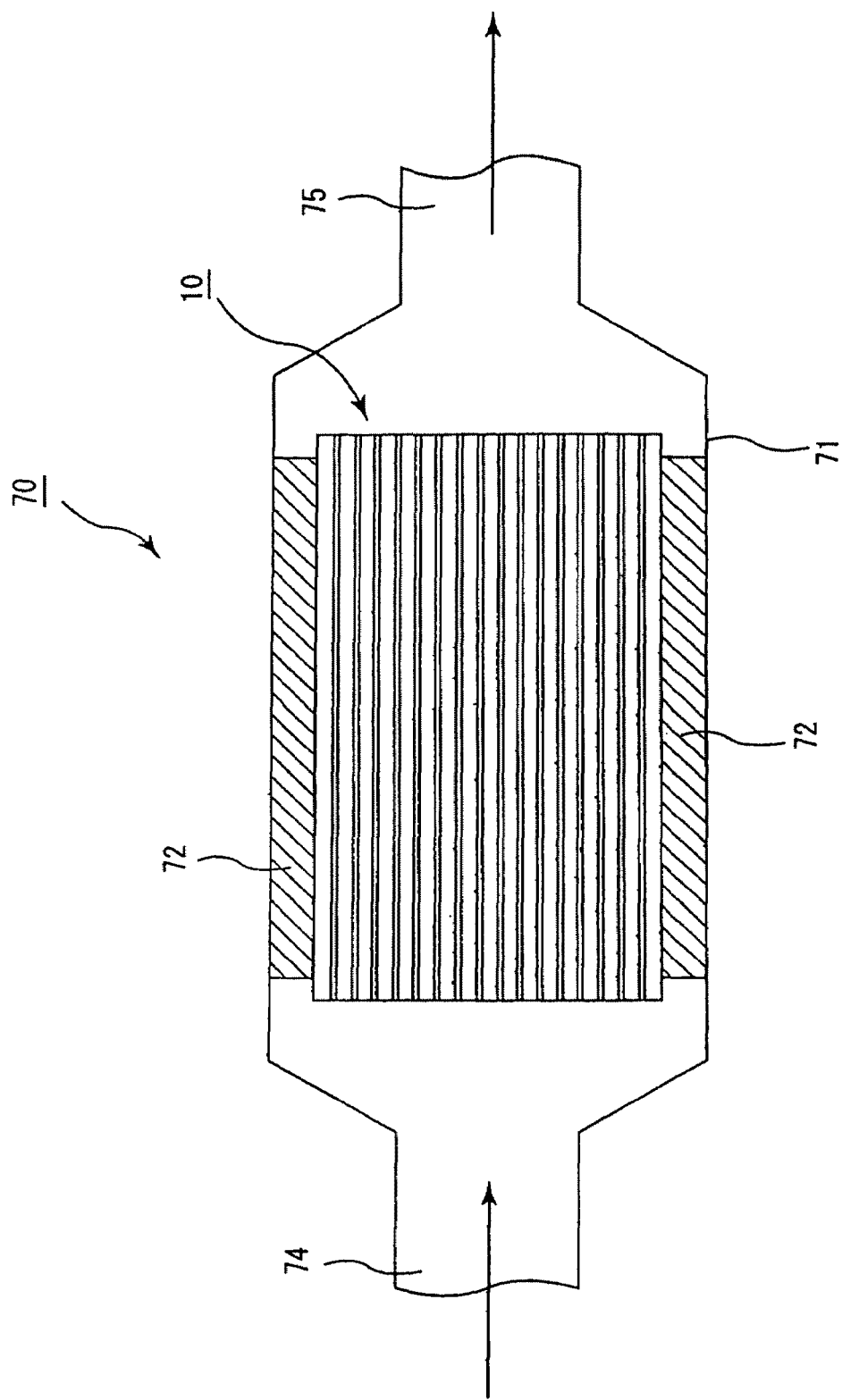
FIG. 3 is a cross-sectional view that schematically shows one example of an exhaust gas purifying device for a vehicle in which the honeycomb structured body in accordance with the embodiments of the present invention is installed.

FIG. 3 is a cross-sectional view that schematically shows one example of an exhaust gas purifying device for a vehicle in which the honeycomb structured body in accordance with the embodiments of the present invention is installed.

As shown in FIG. 3, an exhaust gas purifying device 70 is mainly configured by a honeycomb structured body 10, a casing 71 that covers the outside of the honeycomb structured body 10, and a holding sealing material 72 placed between the honeycomb structured body 10 and the casing 71, and an introducing pipe 74 coupled to an internal combustion system such as an engine is connected to the end portion of the casing 71 on the side to which exhaust gases are introduced, with an exhaust pipe 75 coupled to the outside being connected to the other end portion of the casing 71. In FIG. 3, arrows indicate flows of exhaust gases.

In the exhaust gas purifying device 70 having the above-mentioned configuration, exhaust gases, discharged from an internal combustion system such as an engine, are introduced into the casing 71 through the introducing pipe 74, and allowed to flow into the honeycomb structured body from the inlet side cells and pass through a wall portion so that, after particulates therein have been captured through this wall portion to purify the exhaust gases, the resulting exhaust gases are discharged outside the honeycomb structured body from the outlet side cells through the exhaust pipe 75. Moreover, catalyst is adhered to the honeycomb structured body, and thereby toxic gas components such as CO, HC, NOx in exhaust gases can be converted.

In the exhaust gas purifying device 70, when a large amount of particulates are disposed on the wall portion of the honeycomb structured body and the pressure loss becomes high, a regenerating process of the honeycomb structured body is carried out.

In the regenerating process, particulates may be burned and removed using a post-injection method, or a catalyst supporting layer and catalyst layer may further be formed in front of the honeycomb structured body to use reaction heat deriving therefrom. Moreover, the particulates disposed on the wall portion may be burned and removed through a method in which the honeycomb structured body is heated by allowing gases which are heated by heating means, which is not shown, to flow into the cells of the honeycomb structured body.

In the honeycomb structured body of the present invention to which a catalyst is adhered, particulates can be burned and removed by lower temperature than the normal temperature, with respect to the type and the like of the catalyst.

Next, the honeycomb structured body in accordance with the embodiments of the second aspect of the present invention is explained.

A honeycomb structured body according to the embodiments of the second aspect of the present invention is a honeycomb structured body comprising a porous ceramic in which a plurality of cells which are allowed to penetrate in a longitudinal direction with a wall portion therebetween and either one end of which is sealed, and a catalyst supporting layer adhered to the wall portion, wherein
pores formed in the porous ceramic are constituted by large pores having a relatively large pore diameter and small pores having a relatively small pore diameter, and supposing that:
the thickness of the catalyst supporting layer is $X_2$ (μm), and
the value, obtained by multiplying the porosity (%) of the porous ceramic by the ratio (the average pore diameter of the large pores/the average pore diameter of the small pores) of the average pore diameter of the large pores to the average pore diameter of the small pores, is $Y_2$,
these $X_2$ and $Y_2$ are allowed to satisfy the following inequalities (3) and (4):

$$6X_2+80.5 \leq Y_2 \leq 6X_2+230.5 \quad (3)$$

$$-6X_2+330 \leq Y_2 \leq -6X_2+474 \quad (4).$$

Figure 4A:
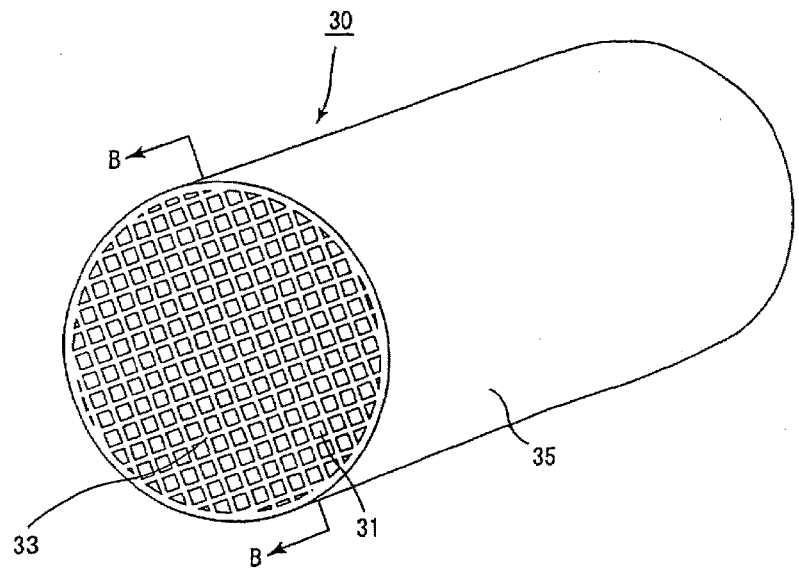
FIG. 4A is a perspective view that schematically shows the honeycomb structured body in accordance with one embodiment of the second aspect of the present invention.
Figure 4B:
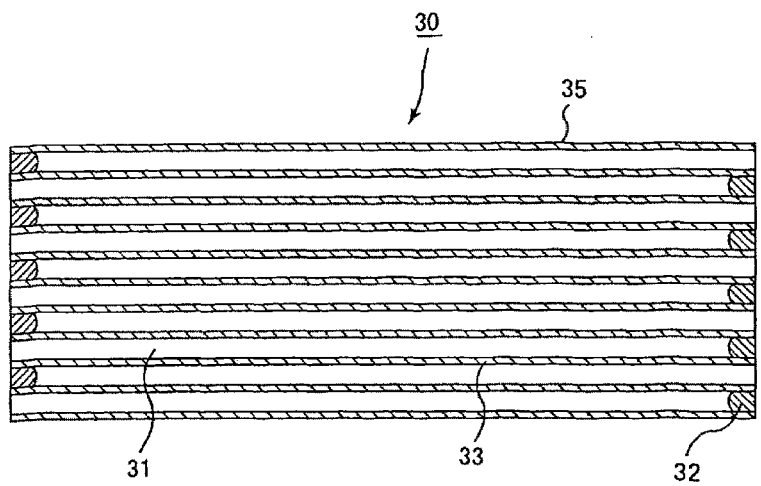
FIG. 4B shows its cross-sectional view taken along line B-B.

FIG. 4A is a perspective view that schematically shows a specific example of an integral honeycomb structured body which is another example of the honeycomb structured body in accordance with one embodiment of the second aspect of the present invention, and FIG. 4B is a cross-sectional view taken along line B-B of FIG. 4A.

As shown in FIG. 4A, the honeycomb structured body 30 in accordance with one embodiment of the present invention is formed by a cylindrical ceramic block 35 consisting of a porous ceramic in which a number of cells 31 are placed in parallel with one another in the longitudinal direction with a wall portion (cell wall) 33 interposed therebetween. Here, the wall portion refers to both the cell wall that separates the cells 31, and the outer peripheral portion of the ceramic block.

As shown in FIG. 4B, in the honeycomb structured body 30 in accordance with one embodiment of the second aspect of the present invention, the ceramic block 35 has a structure in which either one of the end portions of the cell 31 is sealed with a plug 32.

In other words, in the ceramic block 35 of the honeycomb structured body 30 of the present invention, predetermined cells 31 are sealed by the plugs 32 at one of the end portions, and at the other end portion thereof, the cells 31 that have not been sealed by the plugs 32 are sealed by the plugs 32.

In this structure, exhaust gases that have flowed into one cell 31 are always allowed to flow out of another cell 31 after having passed through the cell wall 33 separating the cells 31 so that the cell wall 33 separating the cells 31 from each other is allowed to function as a particle capturing filter.

Although not shown in FIG. 4A, in the same manner as the honeycomb structured body 10 shown in FIG. 1, a sealing material layer may be formed on the periphery of the ceramic block 35.

The porous ceramic material forming the honeycomb structured body is not particularly limited, and examples thereof include: oxide ceramics such as cordierite, alumina, silica, mullite, zirconia, and yttria; carbide ceramics such as silicon carbide, zirconium carbide, titanium carbide, tantalum carbide, and tungsten carbide; nitride ceramics such as aluminum nitride, silicon nitride, boron nitride and titanium nitride.

Here, the honeycomb structured body 10 may be formed by using materials of two or more kinds, such as a composite body between silicon and silicon carbide, or aluminum titanate. In the case where the composite body between silicon and silicon carbide is used, silicon is desirably added thereto so as to be set to at least about 0% and at most about 45% by weight in the entire body.

Among those materials, oxide ceramics such as cordierite or aluminum titanate may be preferably used. This material cuts manufacturing costs, and has a comparatively low coefficient of thermal expansion so that, for example, the honeycomb structured body of the present invention tends to be prevented from being broken and oxidized while used as the above-mentioned honeycomb filter.

Although the shape of the ceramic block 35 in the honeycomb structured body 30 in accordance with one embodiment of the second aspect of the present invention shown in FIG. 4A is a cylindrical shape, with respect to the present invention, the ceramic block is not limited to the cylindrical shape as long as it has a pillar shape, and any shape, such as a cylindroid shape and a rectangular pillar-shape, may also be used.

The honeycomb structured body 30 in accordance with one embodiment of the second aspect of the present invention is a honeycomb structured body configured with the catalyst supporting layer adhered thereto, and the catalyst supported thereon to the catalyst supporting layer.

With respect to the catalyst, although not particularly limited, those which can reduce activating energy of burning particulates or convert toxic gas components such as CO, HC and NOx in exhaust gases are desirably used, and examples thereof may include noble metals such as platinum, palladium and rhodium, and the like. Among these, a so-called three-way catalyst, made from platinum, palladium and rhodium, is desirably used. Moreover, in addition to the noble metal, an alkali metal (Group 1 in Element Periodic Table), an alkali earth metal (Group 2 in Element Periodic Table), a rare-earth element (Group 3 in Element Periodic Table), a transition metal element and the like may be supported thereon.

Such honeycomb structured body 30 is capable of converting CO, HC, and NOx and the like in exhaust gases.

With the catalyst supported on the catalyst supporting layer of the honeycomb structured body 30, the honeycomb structured body 30 is allowed to function as a filter for capturing particulates in exhaust gases, as well as a catalyst converter for converting CO, HC, NOx and the like contained in exhaust gases.

Moreover, when applying the catalyst to the ceramic block 35, it is desirable to apply the catalyst after the surface thereof is coated with a catalyst supporting carrier such as alumina, as described above. With this arrangement, the specific surface area is made greater so that the degree of dispersion of the catalyst tends to easily be improved and the reaction sites of the catalyst also tend to increase easily. Since it may become possible to easily prevent sintering of the catalyst metal by the catalyst supporting carrier, the heat resistance of the catalyst is also improved.

With respect to the catalyst supporting layer, oxide ceramics such as alumina, titania, zirconia, silica and ceria can be used.

Moreover, by supporting the catalyst, oxidation reaction and the like progress on the catalyst, and heat of reaction is generated, thereby easily raising the temperature of the honeycomb structured body 30.

According to the honeycomb structured body in accordance with the embodiments of the second aspect of the present invention, pores formed in the porous ceramic are constituted by large pores having a relatively large pore diameter and small pores having a relatively small pore diameter, and supposing that:

the thickness of the catalyst supporting layer is $X_2$ (μm), and the value, obtained by multiplying the porosity (%) of the porous ceramic by the ratio (the average pore diameter of the large pores/the average pore diameter of the small pores) of the average pore diameter of the large pores to the average pore diameter of the small pores, is $Y_2$, these $X_2$ and $Y_2$ are allowed to satisfy the following inequalities (3) and (4):

$$6X_2 + 80.5 \leq Y_2 \leq 6X_2 + 230.5 \quad (3)$$

$$-6X_2 + 330 \leq Y_2 \leq -6X_2 + 474 \quad (4).$$

In the same manner as the honeycomb structured body according to the embodiments of the first aspect of the present invention, in the honeycomb structured body according to the embodiments of the second aspect of the present invention, when the thickness of the catalyst supporting layer is plotted on the X-axis, with the value, obtained by multiplying the ratio of large pore diameter/small pore diameter by the porosity (%) of the porous ceramic, being plotted on the Y-axis, an area inside a parallelogram enclosed by four lines, $Y_2=6X_2+80.5$, $Y_2=6X_2+230.5$, $Y_2=-6X_2+330$ and $Y_2=-6X_2+474$, is given as a range of the invention of the present application.

In the honeycomb structured body according to the embodiments of the second aspect of the present invention, when the relationship between the thickness of the catalyst supporting layer and the value of (the average pore diameter of large pores/the average pore diameter of small pores)×(the porosity of the porous ceramic) is allowed to satisfy the above-mentioned inequalities (3) and (4) as mentioned above, it may be come easier to provide a honeycomb structured body which exerts sufficient catalyst functions, can easily reduce the initial pressure loss when used as a filter or the like, makes the pressure loss hardly increase after capturing particulates, and also has a sufficient mechanical strength.

In the case where $Y_2$ does not satisfy any of $Y_2 \leq 6X_2+230.5$ and $Y_2 \leq -6X_2+474$, that is, when $Y_2 > 6X_1+230.5$ or $Y_2 > -6X_2+474$ is satisfied, the following problems arise.

When $Y_2$ is indicated by $Y_2 > 6X_2+230.5$, the diameter of large pores becomes too large and a reduction in the strength of the base member may occur easily, which tends to easily cause insufficient durability in the filter. In contrast, when $Y_2$ is indicated by $Y_2 > -6X_2+474$, the small pores tend to become easily clogged by the catalyst, making it difficult for a catalyst reaction to take place.

In the case where $Y_2$ does not satisfy any of $6X_2+80.5 \leq Y_2$ and $-6X_2+330 \leq Y_2$, that is, when $Y_2 < 6X_2+80.5$ or $Y_2 < -6X_2+330$ is satisfied, the following problems arise.

In these cases, the possible problems are that the small pores become too large and that the large pores become too small.

In the case where the small pores become too large, upon capturing particulates, the particulates tend to easily be deep-layer-filtered inside the small pore to cause a thick deposition layer of the particulates that tends to cause an increase in the pressure loss.

In contrast, in the case where the large pores become too small, the gas permeability tends to deteriorate, resulting in an increase in the transient pressure loss. Additionally, in the case where the large pores become too small, since ultra-large pores, which are formed by at least about two large pores and at most about three large pores which are located close to one another, are hardly generated, the gas permeability tends to deteriorate in comparison with the structure in which ultra-large pores are present.

The thickness of a catalyst supporting layer that satisfies the inequalities of (3) and (4) is set to at least about 8.3 μm and at most about 33 μm, as in the case of the inequalities of (1) and (2).

In the case where the thickness $X_2$ of the catalyst supporting layer is about 8.3 μm or more, since the amount of the catalyst supporting carrier or the like may be prevented from becoming too small, degradation in the dispersing property of a noble metal catalyst may be prevented from occurring and it may become possible to provide a honeycomb structured body having sufficient durability in the catalyst; in contrast, in the case where the thickness $X_2$ of the catalyst supporting layer is about 33 μm or less, the thickness of the catalyst supporting layer may be prevented from becoming too thick. Thus, even when the diameter of the small pores is made larger, the small pores may be prevented from being clogged, and gases may easily pass through the surface of each small pore, making it easier to exert a catalyst reaction.

The porosity of the porous ceramic is not particularly limited, and the lower limit value is desirably set to about 40%, while the upper limit value is desirably set to about 75%. When the porosity is about 40% or more, it becomes easier to increase the rate of large pores; therefore, the effects of the formation of the large pores tend to be easily obtained. In contrast, when the porosity is about 75% or less, it becomes easier to maintain sufficient mechanical strength in the honeycomb structured body.

The upper limit of the porosity of the porous ceramic is more desirably set to about 65%.

The above-mentioned porosity can be measured through known methods such as a mercury injection method, Archimedes method and a measuring method using a scanning electron microscope (SEM).

As described above, the pore diameter of the large pores forming the honeycomb structured body 30 is set in a range of 30 to 100 μm when observed by an SEM, and the lower limit of the pore diameter of the large pores is desirably set to 40 μm. In the case where the average pore diameter of the large pores is less than 30 μm, since the pore diameter is too small to serve as the large pores, the pores tend to be clogged with a slight increase in the thickness of the catalyst supporting layer to easily cause an increase in the pressure loss. In contrast, when the average pore diameter of the large pores exceeds 100 μm, the pore diameter becomes too large, making it difficult to sufficiently increase the mechanical strength.

In addition to the large pores, the honeycomb structured body 30 desirably contains ultra-large pores that have a pore diameter exceeding 100 μm when observed by an SEM. Thereby, the effect for reducing the pressure loss tends to be come greater.

Moreover, the honeycomb structured body 30 desirably contains the ultra-large pores, each having a diameter of at least about 40% and at most about 90% of the thickness of each wall portion (cell wall) that separates cells of the honeycomb structured body 30. When the diameter is about 40% or more, it becomes easier to obtain the effect for suppressing an increase in the pressure loss; in contrast, when the diameter is about 90% or less, it becomes easier to maintain sufficient mechanical strength in the honeycomb structured body 30.

In the case where the ultra-large pores are contained in the honeycomb structured body, since portions that allow gases to escape easily are generated in the honeycomb structured body, the gas permeability of the honeycomb structured body is improved so that the pressure loss hardly increases even upon capturing of particulates.

As will be described later, since the thickness of each cell wall is desirably set to about 0.6 mm or less, the diameter of the ultra-large pore is desirably set to about 540 μm or less. Furthermore, the large pores to be formed in the honeycomb structured body 30 desirably include ultra-large pores, each having a diameter in the range of about 65% to about 80% of the thickness of each wall portion (cell wall) that separates cells of the honeycomb structured body 30.

The rate of the ultra-large pores among the pores that are 30 μm or more is desirably set to at least about 30 vol % and at most about 80 vol %.

The ultra-large pore is formed due to a plurality of pore-forming agents in a ceramic molded body used for firing being located close to each other, and the aspect ratio of the ultra-large pore is desirably about 2 or more.

Thus, since the ultra-large pore is allowed to have a long and narrow shape, gases can readily pass through the ultra-large pore.

As will be described later in detail, the pore-forming agent is a material that is mainly used for forming large pores in the porous ceramic (porous ceramic member), and contained in the ceramic molded body to be fired.

The pore diameter of the small pores in the porous ceramics is less than 30 μm, when observed by the SEM; however, the pore diameter is more desirably set to about 5 μm or more. In the case where the average diameter of the small pores becomes less than 30 μm or more, since the small pores tend to be prevented from becoming too large, it may becomes difficult for particulates to be deep-layer-filtered and a thick deposition layer of the particulates tends to be prevented from occurring, to also prevent the pressure loss from becoming high. In contrast, when the average pore diameter of the small pores is about 5 μm or more, the pore diameter may be prevented from becoming too small. Therefore, even when the thickness of the catalyst supporting layer is made thinner, the pressure loss tends to be prevented from becoming high.

With respect to the above-mentioned pore-forming agent, examples thereof include balloons that are fine hollow spheres composed of oxide-based ceramics; organic particles comprising an organic matter (e.g. resin and the like) such as spherical acrylic particles; and inorganic particles such as graphite.

With respect to the above-mentioned balloons, although not particularly limited, examples thereof include alumina balloons, glass micro-balloons, shirasu balloons, fly ash balloons (FA balloons), mullite balloons and the like. Among these, alumina balloons are more desirably used.

With respect to the particle diameter of the ceramic used upon manufacturing the honeycomb structured body 30, although not particularly limited, those which are less susceptible to shrinkage in the succeeding firing process are desirably used, and for example, those particles, prepared by combining 100 parts by weight of particles having an average particle diameter of at least about 0.3 μm and at most about 50 μm with at least about 5 parts by weight and at most about 65 parts by weight of particles having an average particle diameter of at least about 0.1 μm and at most about 1.0 μm, are desirably used.

By selecting the ceramic powders having the above-mentioned particle diameter based on the combination and mixing them, porosity and the proportion of fine pores having a pore diameter of about 10 μm or less can be controlled to a certain degree.

With respect to the above-mentioned pore-forming agent, the same pore-forming agents as those described in the first aspect of the present invention may be used.

With respect to the material for the plug, thickness of the partition walls, the material for the sealing material layer, the size and type of the cell, etc. in the ceramic block 35, those factors that are the same as those of the honeycomb structured body of the first aspect of the present invention may be used; therefore, detailed description thereof is omitted herein.

The following description will discuss one example of a manufacturing method of the honeycomb structured body in accordance with the embodiments of the second aspect of the present invention.

First, an extrusion-molding process is carried out by using material paste mainly composed of the ceramic material as described above so that a cylindrical ceramic molded body to form a ceramic block is manufactured. Here, except that the shape of the molded body is a cylinder and that the dimension is larger in comparison with the first aspect of the present invention, the same binder, pore-forming agent, dispersant and the like as those of the first aspect of the present invention are used and the molded body is formed by using the same method; therefore, detailed description thereof is omitted herein.

Next, in the same manner as the honeycomb structured body in accordance with the first aspect of the present invention, the above-mentioned ceramic molded body is dried by using a drier such as a microwave drier, a hot-air drier, a dielectric drier, a reduced-pressure drier, a vacuum drier and a frozen drier so that a ceramic dried body is formed. Thereafter, a predetermined amount of plug material paste, which forms plugs, is filled into the end portion on the outlet side of the inlet-side group of cells and the end portion on the inlet side of the outlet-side group of cells so that the cells are sealed.

Then, as in the first aspect of the present invention, the result is degreased and fired to manufacture a ceramic block, a catalyst supporting carrier is adhered to the wall portion, and catalyst is supported thereon.

In accordance with each of the honeycomb structured bodies according to the first and second aspects of the present invention, when the relationship between the value of (the average pore diameter of large pores/the average pore diameter of small pores)×the porosity of the porous ceramic (porous ceramic member) and the thickness of the catalyst supporting layer formed in the honeycomb structured body is allowed to satisfy the above-mentioned inequalities (1) and (2) or the above-mentioned inequalities (3) and (4), it becomes easier to provide a honeycomb structured body which tends to exert sufficient catalyst functions, easily reduce the initial pressure loss when used as a filter or the like, make the pressure loss hardly increase upon capturing of particulates, and also tends to have a sufficient mechanical strength.

Moreover, upon supporting a catalyst (catalyst supporting carrier) on such a honeycomb structured body, it is supposed that a comparatively large amount of catalyst (catalyst supporting carrier) can be supported; thus, a problem such as, depending on the structure of the honeycomb structured body, the supported catalyst tends to easily cause clogging in the pores, thereby resulting in increase in an initial pressure loss may be prevented from occurring. Moreover, the initial pressure loss may be prevented from becoming high, a contact reaction with exhaust gases may easily occur in a sufficient manner, such that a sufficient catalyst capability may be exerted.

The honeycomb structured body in accordance with the embodiments of the present invention has a catalyst supporting layer adhered thereto in a manner that tends to make the initial pressure loss hardly increase and also to make the pressure loss hardly increase even after capturing particulates, and such honeycomb structured body tends to carry out contact to exhaust gases and the like favorably to sufficiently exert catalyst functions.

EXAMPLES

The following description will discuss the present invention in detail by means of examples; however, the present invention is not intended to be limited by these examples.

Example 1

Powder of α-type silicon carbide (SiC coarse powder) having an average particle diameter of 11 μm (70 parts by weight) and powder of α-type silicon carbide having an average particle diameter of 0.5 μm (30 parts by weight) were wet-mixed, and to 100 parts by weight of the resulting mixture were added and kneaded 10 parts by weight of acrylic particles having an average particle diameter of 40 μm and 5.7 parts by weight of an organic binder (methyl cellulose) and 26.6 parts by weight of water to prepare a mixed composition.

Next, to the above-mentioned mixed composition were added 2 parts by weight of a plasticizer (UNILUBE, made by NOF Corp.) and 5 parts by weight of (glycerin) serving as a lubricant, and this was further kneaded, and then extrusion-molded to manufacture a raw molded body having a rectangular pillar shape as shown in FIG. 2A. Here, the above-mentioned acrylic particles were added as a pore-forming agent used for forming pores.

After the above-mentioned raw molded body had been dried by using a microwave drier or the like to manufacture a ceramic dried body, predetermined cells were filled with a plug material paste having the same composition as the raw molded body.

Next, after this had been again dried by using a drier, the resulting product was degreased at 400° C., and fired at 2250° C. in a normal-pressure argon atmosphere for 3 hours to manufacture a porous ceramic member 20, which was a silicon carbide sintered body with an average pore diameter of the small pores of 20 μm, a average pore diameter of large pores of 90 μm, a porosity of 60%, having a size of 34.3 mm×34.3 mm×150 mm, the number of cells 21 of 28 pcs/cm$^2$ and a thickness of substantially all the wall portions 23 of 0.30 mm. When the size of the ceramic particles constituting this porous ceramic member 20 was observed by using an SEM, it was 11 μm, which was almost the same size of the SiC coarse powder.

By using a heat resistant adhesive paste containing 30% by weight of alumina fibers having an average fiber length of 20 μm, 21% by weight of silicon carbide particles having an average particle diameter of 0.6 μm, 15% by weight of silica sol, 5.6% by weight of carboxymethyl cellulose and 28.4% by weight of water, a number of the porous ceramic members 20 were bonded to one another, and this was cut by using a diamond cutter so that a pillar-shaped ceramic block 15 was manufactured.

Next, ceramic fibers made from alumina silicate (shot content: 3%, fiber length: 5 to 100 μm) (23.3% by weight), which served as inorganic fibers, silicon carbide powder having an average particle diameter of 0.3 μm (30.2% by weight), which served as inorganic particles, silica sol (SiO$_2$ content in the sol: 30% by weight) (7% by weight), which served as an inorganic binder, carboxymethyl cellulose (0.5% by weight), which served as an organic binder, and water (39% by weight) were mixed and kneaded to prepare a sealing material paste.

Next, a sealing material paste layer having a thickness of 0.2 mm was formed on the peripheral portion of the ceramic block 15 by using the above-mentioned sealing material paste. Further, this sealing material paste layer was dried at 120° C. so that a pillar-shaped aggregated honeycomb structured body 10 having a size of 143.8 mm in diameter×150 mm in length was manufactured.

Next, γ-alumina was mixed with water and a nitric acid solution serving as a dispersant, and the result was further pulverized by using a ball mill under 90 min$^{-1}$ for 24 hours to prepare an alumina slurry having an average particle diameter of 2 μm. Then, a honeycomb structured body was immersed in the resulting slurry, and after having been taken out, this was dried at 200° C.

The above-mentioned processes were repeated until the alumina layer (catalyst supporting layer) had reached a thickness of 10 μm, and the result was fired at 600° C.

Next, diammine dinitro platinum nitric acid ([Pt(NH$_3$)$_2$(NO$_2$)$_2$]HNO$_3$) having a platinum concentration of 4.53% by weight was diluted with distilled water, and the ceramic fired body on which the alumina layer containing a rare-earth oxide had been formed was immersed in this solution, and this was then heated at 110° C. for 2 hours, and further heated in a nitrogen atmosphere at 500° C. for one hour so that 5 g/L of a platinum catalyst having an average particle diameter of 2 nm was supported on the surface of the ceramic fired body, thereby completing the manufacturing process of the honeycomb structured body on which the catalyst had been supported.

Tables 3-1 and 3-2 show the average pore diameter of small pores, the average pore diameter of large pores, the porosity and the value of (the average pore diameter of large pores/the average pore diameter of small pores)×porosity, obtained after supporting of catalyst. FIG. 5 is a graph in which values of the respective examples are plotted with the catalyst thickness being indicated on the x-axis and the value of (the average pore diameter of large pores/the average pore diameter of small pores)×porosity after supporting of catalyst being indicated on the y-axis.

Examples 2 to 8 Comparative Examples 1 to 11

The same processes as those of Example 1 were carried out except that, upon forming a molded body, a mixed composition was formed by mixing respective components as shown in Table 1 and the molded body was formed through extrusion molding under firing conditions as shown in Table 1, so that a honeycomb structured body 10 was manufactured through the same process as in Example 1, and a catalyst supporting layer having the thickness described in Tables 3-1 and 3-3 was adhered to the resulting honeycomb structured body 10, and a catalyst was supported thereon.

Tables 3-1 to 3-4 show the average pore diameter of small pores, the average pore diameter of large pores, the porosity and the value of (the average pore diameter of large pores/the average pore diameter of small pores)×porosity, etc. obtained after supporting of catalyst. FIG. 5 is a graph in which values of the respective examples are plotted with the catalyst thickness being indicated on the x-axis and the value of (the average pore diameter of large pores/the average pore diameter of small pores)×porosity after supporting of catalyst being indicated on the y-axis.

TABLE 1

| | SiC coarse powder | | SiC fine powder | | Acrylic powder | | Methyl-cellulose (parts by weight) | Water (parts by weight) | Plasticizer (parts by weight) | Lubricant (parts by weight) | Firing temperature (° C.) 3 hours |
|---|---|---|---|---|---|---|---|---|---|---|---|
| | Average particle diameter (μm) | Amount (parts by weight) | Average particle diameter (μm) | Amount (parts by weight) | Average particle diameter (μm) | Amount (parts by weight) | | | | | |
| Example 1 | 11 | 70 | 0.5 | 30 | 40 | 10 | 5.7 | 26.6 | 2 | 5 | 2250 |
| Example 2 | 11 | 70 | 0.5 | 30 | 40 | 10 | 5.7 | 26.6 | 2 | 5 | 2250 |
| Example 3 | 11 | 70 | 0.5 | 30 | 40 | 10 | 5.7 | 26.6 | 2 | 5 | 2250 |
| Example 4 | 11 | 70 | 0.5 | 30 | 40 | 40 | 5.7 | 26.6 | 2 | 5 | 2250 |
| Example 5 | 11 | 70 | 0.5 | 30 | 40 | 40 | 5.7 | 26.6 | 2 | 5 | 2250 |
| Example 6 | 22 | 70 | 0.5 | 30 | 60 | 14 | 5.7 | 26.6 | 2 | 5 | 2250 |
| Example 7 | 22 | 70 | 0.5 | 30 | 60 | 14 | 5.7 | 26.6 | 2 | 5 | 2250 |
| Example 8 | 11 | 70 | 0.5 | 30 | 40 | 10 | 5.7 | 26.6 | 2 | 5 | 2200 |
| Comparative Example 1 | 11 | 70 | 0.5 | 30 | 40 | 10 | 5.7 | 26.6 | 2 | 5 | 2250 |
| Comparative Example 2 | 11 | 70 | 0.5 | 30 | 40 | 10 | 5.7 | 26.6 | 2 | 5 | 2250 |
| Comparative Example 3 | 11 | 70 | 0.5 | 30 | 40 | 10 | 5.7 | 26.6 | 2 | 5 | 2250 |
| Comparative Example 4 | 22 | 70 | 0.5 | 30 | 60 | 10 | 5.7 | 26.6 | 2 | 5 | 2200 |
| Comparative Example 5 | 11 | 70 | 0.5 | 30 | 40 | 10 | 5.7 | 26.6 | 2 | 5 | 2100 |
| Comparative Example 6 | 22 | 70 | 0.5 | 30 | 60 | 22 | 5.7 | 26.6 | 2 | 5 | 2250 |
| Comparative Example 7 | 30 | 80 | 0.5 | 20 | — | — | 10 | 26.6 | 2 | 5 | 2300 |
| Comparative Example 8 | 30 | 80 | 0.5 | 20 | — | — | 10 | 26.6 | 2 | 5 | 2200 |
| Comparative Example 9 | 11 | 70 | 0.5 | 30 | — | — | 5.5 | 18 | 2 | 3 | 2200 |
| Comparative Example 10 | 22 | 70 | 0.5 | 30 | 60 | 22 | 5.7 | 26.6 | 2 | 5 | 2250 |
| Comparative Example 11 | 11 | 70 | 0.5 | 30 | 60 | 20 | 10 | 26.6 | 2 | 5 | 2250 |

Example 9

Talc powder having an average particle diameter of 10 μm (40 parts by weight), kaolin powder having an average particle diameter of 9 μm (10 parts by weight), alumina powder having an average particle diameter of 9.5 μm (17 parts by weight), powder of aluminum hydroxide having an average particle diameter of 5 μm (16 parts by weight) and silica powder having an average particle diameter of 10 μm (15 parts by weight) were wet-mixed, and to 98 parts by weight of the resulting mixture were added and kneaded 10 parts by weight of acrylic particles having an average particle diameter of 40 μm, 5 parts by weight of an organic binder (carboxymethyl cellulose), 4 parts by weight of a dispersant (UNILUBE, made by NOF Corp.), 11 parts by weight of a solvent (diethylene glycol mono-2-ethylhexyl ether, KYOWANOL OX20 made by Kyowa Hakko Chemical Co., Ltd) and 2 parts by weight of another dispersant, and the resulting kneaded matter was extrusion-molded to manufacture a raw molded body having a cylindrical shape as shown in FIG. 4A. Here, the above-mentioned acrylic particles were added as a pore-forming agent used for forming pores.

After the above-mentioned raw molded body had been dried by using a microwave drier or the like to manufacture a ceramic dried body, predetermined cells were filled with a plug material paste having the same composition as the raw molded body.

Next, after this had been again dried by using a drier, the result was degreased at 400° C., and fired at 1400° C. in a normal-pressure atmosphere for 3 hours to manufacture a cylindrical-shaped honeycomb structured body 30 made from cordierite, which had an average pore diameter of small pores of 20 μm, an average pore diameter of large pores of 90 μm, a porosity of 60%, the number of cells 21 of 28 pcs/cm² and a thickness of substantially all the wall portions 23 of 0.30 mm, with a size of 143.8 mm in diameter×150 mm in length. When the size of the ceramic particles constituting this honeycomb structured body 30 was observed by using an SEM, it was about 10 μm.

This honeycomb structured body 30 was immersed in an alumina slurry having an average particle diameter of 2 μm prepared in the same manner as Example 1, and after having been taken out, the result was dried at 200° C.

The above-mentioned processes were repeated until the alumina layer (catalyst supporting layer) had reached a thickness of 10 μm, and the result was fired at 600° C.

Diammine dinitro platinum nitric acid ([Pt(NH$_3$)$_2$(NO$_2$)$_2$] HNO$_3$) having a platinum concentration of 4.53% by weight was diluted with distilled water, and the ceramic fired body on which the alumina layer containing a rare-earth oxide had been formed was immersed in this solution, and this was then heated at 110° C. for 2 hours, and further heated in a nitrogen atmosphere at 500° C. for one hour so that 5 g/L of a platinum catalyst having an average particle diameter of 2 nm was supported on the surface of the ceramic fired body, thereby completing the manufacturing process of the honeycomb structured body on which the catalyst had been supported.

Tables 3-1 and 3-2 show the average pore diameter of small pores, the average pore diameter of large pores, the porosity and the value of (the average pore diameter of large pores/the average pore diameter of small pores)×porosity, obtained after supporting of catalyst. FIG. 5 is a graph in which values of the respective examples are plotted with the catalyst thickness being indicated on the x-axis and the value of (the average pore diameter of large pores/the average pore diameter of small pores)×porosity after supporting of catalyst being indicated on the y-axis.

Example 10, Comparative Examples 12 and 13

The same processes as those of Example 9 were carried out except that, upon forming a molded body, a mixed composition was formed by mixing respective components as shown in Tables 2-1 and 2-2 and the molded body was formed through extrusion molding, so that a honeycomb structured body 30 was manufactured, and a catalyst supporting layer having each of thicknesses described in Tables 3-1 and 3-3 was adhered to the resulting honeycomb structured body 30, and a catalyst was supported thereon.

Tables 3-1 to 3-4 show the average pore diameter of small pores, the average pore diameter of large pores, the porosity and the value of (the average pore diameter of large pores/the average pore diameter of small pores)×porosity, obtained after supporting of catalyst. FIG. 5 is a graph in which values of the respective examples are plotted with the catalyst thickness being indicated on the x-axis and the value of (the average pore diameter of large pores/the average pore diameter of small pores)×porosity after supporting of catalyst being indicated on the y-axis.

TABLE 2-1

|  | Talc | | Kaolin | | Alumina | | Aluminum hydroxide | | Silica | |
| --- | --- | --- | --- | --- | --- | --- | --- | --- | --- | --- |
|  | Particle diameter (μm) | Amount (parts) | Particle diameter (μm) | Amount (parts) | Particle diameter (μm) | Amount (parts) | Particle diameter (μm) | Amount (parts) | Particle diameter (μm) | Amount (parts) |
| Example 9 | 10 | 40 | 9 | 10 | 9.5 | 17 | 5 | 16 | 10 | 15 |
| Example 10 | 10 | 40 | 9 | 10 | 9.5 | 17 | 5 | 16 | 10 | 15 |
| Comparative Example 12 | 10 | 40 | 9 | 10 | 9.5 | 17 | 5 | 16 | 10 | 15 |
| Comparative Example 13 | 10 | 40 | 9 | 10 | 9.5 | 17 | 5 | 16 | 10 | 15 |

Note)
The particle diameter refers to the average particle diameter, and the amount (parts) refers to the parts by weight.

TABLE 2-2

|  | Acrylic particle | | Dispersant | | | | |
| --- | --- | --- | --- | --- | --- | --- | --- |
|  | Particle diameter (μm) | Amount (parts) | (parts by weight) UNILUBE | Solvent (parts) | Dispersant (parts) | Binder (parts) | Firing temperature (° C.) 3 hours |
| Example 9 | 40 | 10 | 4 | 11 | 2 | 5 | 1400 |
| Example 10 | 40 | 10 | 4 | 11 | 2 | 5 | 1400 |
| Comparative Example 12 | — | — | 4 | 11 | 2 | 5 | 1400 |
| Comparative Example 13 | 40 | 10 | 4 | 11 | 2 | 5 | 1400 |

Note)
The particle diameter refers to the average particle diameter, and the amount (parts) refers to the parts by weight.

(Evaluation)

(1) Measurements of Pore Diameter

Each of the honeycomb structured bodies used in the respective examples and comparative examples was cut into cubes of about 1 cm in each side, and put into a plastic container, and after an epoxy resin curing agent had been further added thereto, this was subjected to a degassing process, and then left for one night under normal pressure.

Each of the cured samples with the epoxy resin contained therein was ground by using a diamond disc so as to allow the cross section of the wall portions of the honeycomb structured bodies to appear on the surface.

With respect to each of the samples prepared as described above, the respective 100 large pores, small pores, and ultra-large pores of the honeycomb structured body were observed by using scanning electron microscope (SEM) photographs so that the diameter thereof was measured; thus, the average values thereof were respectively given as the large pore diameter and the small pore diameter. Here, with respect to the determination of the pore diameter, the major axis and the minor axis of each pore were measured, and the length of the major axis was defined as the diameter of the pore. Moreover, in the case of the ultra-large pore, the aspect ratio thereof was calculated based upon the ratio of the length of the major axis and the length of the minor axis.

Moreover, after the catalyst had been supported thereon, the pore diameter and the like were measured in the same manner.

Tables 3-1 to 3-4 show the results of the measurements.

(2) Measurements of Thickness of Catalyst Supporting Layer

Each of the honeycomb structured bodies having a catalyst supporting layer adhered thereto according to the examples and comparative examples was processed in the same manner, and observed by using an SEM at 100 portions where the thickness thereof could be measured; thus, the average value was obtained as the thickness of the catalyst supporting layer. Here, in the case where the small pore is clogged by the catalyst, the pore diameter of the small pore was defined as the thickness of the catalyst layer. Tables 3-1 and 3-3 show the results of the measurements.

(3) Measurements of Porosity

With respect to each of the honeycomb structured bodies according to the examples and comparative examples, the porosity was measured by using Archimedes method. Tables 3-1 and 3-3 show the results of the measurements.

(4) Measurements of Pressure Loss Before and After Capturing Particulates

Each of the honeycomb structured bodies according to the examples and comparative examples was placed in an exhaust passage of an engine to provide an exhaust gas purifying device, and the engine was driven at the number of revolutions of 3000 min$^{-1}$ with a torque of 50 Nm for 100 minutes so that the relationship between the captured amount of particulates and pressure loss was measured. Tables 3-2 and 3-4 show data between the initial pressure loss and transient pressure loss (pressure loss upon capturing of particulates of 8 g/L).

(5) Measurements of Base Member Strength

By using an Instron 5582, a three-point bending test was carried out under conditions of a span of 135 mm and a speed of 1 mm/min, so that the bending strength of each of the honeycomb structured bodies according to the examples and comparative examples was measured. Based upon the results of the measurements, the second moment of area was calculated, and the value was converted to a strength value of a base member without the cell structure and given as the base member strength.

Tables 3-2 and 3-4 show the results of the measurements.

(6) Measurement of Filter Regenerating Rate

Each of the honeycomb structured bodies according to the examples and comparative examples was put into a muffle furnace, and subjected to a heating process at 800° C. for 10 hours. Then, this was installed in an exhaust path in an engine to form an exhaust gas purifying device, and after a thermometer had been placed in the center of the honeycomb structured body, the engine was driven at the number of revolutions of 3000 min$^{-1}$ with a torque of 50 Nm so that 8 g/L of particulates were captured.

Thereafter, the engine was driven at the number of revolutions of 1250 min$^{-1}$ with a torque of 60 Nm, and in a state where the temperature of the filter had become constant, this state was kept for one minute, and a post injection process was then executed, and the exhaust temperature was raised by utilizing the oxide catalyst located on the front side so that particulates were burned.

The conditions of the post injection were set so that the center temperature of the honeycomb structured body became almost constant at 600° C. after a lapse of one minute from the start. Then, the filter regenerating rate was calculated based upon a weight change before and after the filter regenerating process. Tables 3-2 and 3-4 show the results of the measurements.

TABLE 3-1

|  | Small pore diameter (μm) | Large pore diameter (μm) | Presence or absence of ultra-large pore | Aspect ratio of ultra-large pore | Porosity (%) | Amount of supported catalyst (g/L) | Thickness of catalyst (μm) |
| --- | --- | --- | --- | --- | --- | --- | --- |
| Example 1 | 20 | 90 | Present | 2 or more | 60 | 30 | 10 |
| Example 2 | 20 | 90 | Present | 2 or more | 60 | 60 | 15 |
| Example 3 | 20 | 90 | Present | 2 or more | 60 | 90 | 20 |
| Example 4 | 20 | 90 | Present | 2 or more | 60 | 120 | 25 |
| Example 5 | 20 | 90 | Present | 2 or more | 60 | 150 | 30 |
| Example 6 | 25 | 100 | Present | 2 or more | 65 | 90 | 20 |
| Example 7 | 25 | 100 | Present | 2 or more | 65 | 120 | 25 |
| Example 8 | 18 | 80 | Present | 2 or more | 60 | 30 | 15 |
| Example 9 | 20 | 90 | Present | 2 or more | 60 | 30 | 10 |
| Example 10 | 20 | 90 | Present | 2 or more | 60 | 90 | 17 |

TABLE 3-2

|  | Small pore diameter (after supporting catalyst) (μm) | Large pore diameter (after supporting catalyst) (μm) | Porosity (after supporting catalyst) (%) | (Large pore diameter/small pore diameter) × Porosity | Filter regenerating rate | Transient pressure loss (kPa) soot 8 g/L | Base member strength (MPa) |
| --- | --- | --- | --- | --- | --- | --- | --- |
| Example 1 | 18 | 85 | 58 | 273.89 | 91 | 16 | 24 |
| Example 2 | 17 | 90 | 57 | 301.76 | 93 | 18 | 24 |
| Example 3 | 15 | 90 | 55 | 330.00 | 96 | 20 | 26 |
| Example 4 | 14 | 80 | 49 | 280.00 | 98 | 22 | 27 |
| Example 5 | 13 | 80 | 45 | 276.92 | 96 | 24 | 28 |
| Example 6 | 22 | 90 | 55 | 225.00 | 97 | 18 | 20 |
| Example 7 | 19 | 90 | 50 | 236.84 | 97 | 20 | 20 |
| Example 8 | 15 | 80 | 56 | 298.67 | 90 | 18 | 28 |
| Example 9 | 18 | 85 | 59 | 278.61 | 90 | 14 | 10 |
| Example 10 | 17 | 80 | 57 | 268.24 | 93 | 16 | 10 |

Note)
In the expression of (Large pore diameter/small pore diameter) × Porosity, the small pore diameter refers to an average pore diameter of small pores, and the large pore diameter refers to an average pore diameter of large pores.

TABLE 3-3

|  | Small pore diameter (μm) | Large pore diameter (μm) | Presence or absence of ultra-large pore | Aspect ratio of ultra-large pore | Porosity (%) | Amount of supported catalyst (g/L) | Thickness of catalyst (μm) |
| --- | --- | --- | --- | --- | --- | --- | --- |
| Comparative Example 1 | 20 | 90 | Present | 2 or more | 60 | 5 | 5 |
| Comparative Example 2 | 20 | 90 | Present | 2 or more | 60 | 10 | 8 |
| Comparative Example 3 | 20 | 90 | Present | 2 or more | 60 | 180 | 35 |
| Comparative Example 4 | 25 | 90 | Present | 2 or more | 60 | 20 | 8 |
| Comparative Example 5 | 15 | 80 | Present | 2 or more | 60 | 10 | 9 |
| Comparative Example 6 | 30 | 110 | Present | 2 or more | 70 | 90 | 15 |
| Comparative Example 7 | 30 | 100 | Absent | — | 50 | 160 | 30 |
| Comparative Example 8 | 20 | 100 | Absent | — | 50 | 60 | 20 |
| Comparative Example 9 | 11 | 20 | Absent | — | 42 | 20 | 11 |
| Comparative Example 10 | 30 | 110 | Present | 2 or more | 70 | 120 | 20 |
| Comparative Example 11 | 20 | 90 | Present | About 1 | 60 | 30 | 10 |
| Comparative Example 12 | 15 | 30 | Absent | — | 50 | 30 | 13 |
| Comparative Example 13 | 20 | 90 | Present | About 1 | 60 | 90 | 17 |

TABLE 3-4

|  | Small pore diameter (after supporting catalyst) (μm) | Large pore diameter (after supporting catalyst) (μm) | Porosity (after supporting catalyst) (%) | (Large pore diameter/small pore diameter) × Porosity | Filter regenerating rate | Transient pressure loss (kPa) soot 8 g/L | Base member strength (MPa) |
|---|---|---|---|---|---|---|---|
| Comparative Example 1 | 20 | 90 | 60 | 270.00 | 75 | 12 | 22 |
| Comparative Example 2 | 19 | 90 | 59 | 279.47 | 77 | 13 | 22 |
| Comparative Example 3 | 10 | 70 | 40 | 280.00 | 85 | 26 | 28 |
| Comparative Example 4 | 25 | 90 | 58 | 208.80 | 80 | 18 | 20 |
| Comparative Example 5 | 14 | 80 | 59 | 337.14 | 75 | 15 | 29 |
| Comparative Example 6 | 25 | 90 | 63 | 226.80 | 85 | 18 | 12 |
| Comparative Example 7 | 20 | 90 | 38 | 171.00 | 88 | 28 | 18 |
| Comparative Example 8 | 17 | 85 | 40 | 200.00 | 87 | 26 | 22 |
| Comparative Example 9 | 10 | 18 | 40 | 72.00 | 75 | 26 | 48 |
| Comparative Example 10 | 17 | 100 | 60 | 352.94 | 85 | 18 | 14 |
| Comparative Example 11 | 18 | 80 | 58 | 257.78 | 87 | 28 | 26 |
| Comparative Example 12 | 13 | 17 | 46 | 60.15 | 82 | 30 | 15 |
| Comparative Example 13 | 16 | 70 | 50 | 218.75 | 85 | 18 | 12 |

Note)
In the expression of (Large pore diameter/small pore diameter) × Porosity, the small pore diameter refers to an average pore diameter of small pores, and the large pore diameter refers to an average pore diameter of large pores.

As shown in Tables 3-1 to 3-4, each of the honeycomb filters of examples that satisfy the above-mentioned inequalities (1) and (2) or the above-mentioned inequalities (3) and (4) (those having $X_1$ and $Y_1$, or $X_2$ and $Y_2$ located within the inner area of a parallelogram in FIG. 5) has a small transient pressure loss and a high base member strength exceeding a required value (20 MPa), with a sufficient catalyst activity and a high regenerating rate; however, each of the honeycomb filters of comparative examples (those having $X_1$ and $Y_1$, or $X_2$ and $Y_2$ located at the outer area of the parallelogram in FIG. 5) has a small transient pressure loss and a low regenerating rate.

What is claimed as new and desired to be secured by Letters Patent of the United States is:

1. A honeycomb structured body, comprising:
 a plurality of porous ceramic members combined with one another through an adhesive layer,
 each of the porous ceramic members having a plurality of cells in parallel with one another in a longitudinal direction of the cells with a wall portion interposed between adjacent cells, and
 each cell having either one end of its two ends sealed and a catalyst supporting layer adhering to said wall portion,
 wherein pores in said porous ceramic member comprise large pores having a pore diameter of 30 μm to 100 μm, small pores having a pore diameter of less than 30 μm, and ultra large pores having a pore diameter exceeding 100 μm, and
 the thickness of the catalyst supporting layer is $X_1$ (μm), and the value obtained by multiplying the porosity (%) of said porous ceramic member by the ratio of the average pore diameter of said large pores to the average pore diameter of said small pores is $Y_1$,
 $X_1$ and $Y_1$ satisfy the following inequalities (1) and (2):

$$6X_1+80.5 \leq Y_1 \leq 6X_1+230.5 \tag{1}$$

$$-6X_1+330 \leq Y_1 \leq -6X_1+474 \tag{2}.$$

2. The honeycomb structured body according to claim 1, wherein said honeycomb structured body comprises silicon carbide-based ceramics or a composite body between silicon and silicon carbide.

3. The honeycomb structured body according to claim 1, wherein said ultra-large pore is formed due to a plurality of pore-forming agents in a ceramic molded body used for firing being located close to each other, and the aspect ratio of said ultra-large pore is about 2 or more.

4. The honeycomb structured body according to claim 1, wherein the thickness of said catalyst supporting layer is at least about 8.3 μm and at most about 33 μm.

5. The honeycomb structured body according to claim 1, wherein the porosity of said porous ceramic member is at least about 40% and at most about 75%.

6. The honeycomb structured body according to claim 1, wherein the honeycomb structured body contains ultra-large pores, each having a diameter of at least about 40% and at most about 90% of the thickness of each of said wall portion.

7. A honeycomb structured body, comprising:
 a porous ceramic having a plurality of cells in parallel with one another in a longitudinal direction of the cells with a wall portion interposed between adjacent cells, and
 each cell having either one end of its two ends sealed and a catalyst supporting layer adhering to said wall portion, wherein pores in said porous ceramic comprise large pores having a pore diameter of 30 μm and 100 μm, small pores having a pore diameter of less than 30 μm, and ultra large pores having a pore diameter exceeding 100 μm, and the thickness of said catalyst supporting layer is $X_2$ (μm), and the value obtained by multiplying the porosity (%) of said porous ceramic by the ratio of the average pore diameter of said large pores to the average pore diameter of said small pores is $Y_2$, $X_2$ and $Y_2$ satisfy the following inequalities (3) and (4):

$$6X_2+80.5 \leq Y_2 \leq 6X_2+230.5 \quad (3)$$

$$-6X_2+330 \leq Y_2 \leq -6X_2+474 \quad (4).$$

8. The honeycomb structured body according to claim 7, wherein said honeycomb structured body comprises cordierite or aluminum titanate.

9. The honeycomb structured body according to claim 7, wherein said ultra-large pore is formed due to a plurality of pore-forming agents in a ceramic molded body used for firing being located close to each other, and the aspect ratio of said ultra-large pore is about 2 or more.

10. The honeycomb structured body according to claim 7, wherein the thickness of said catalyst supporting layer is at least about 8.3 μm and at most about 33 μm.

11. The honeycomb structured body according to claim 7, wherein the porosity of said porous ceramic is at least about 40% and at most about 75%.

12. The honeycomb structured body according to claim 7, wherein the honeycomb structured body contains ultra-large pores, each having a diameter of at least about 40% and at most about 90% of the thickness of each of said wall portion.

* * * * *